US012693836B2

(12) United States Patent
Bérard et al.

(10) Patent No.: US 12,693,836 B2
(45) Date of Patent: Jul. 28, 2026

(54) CONFIGURATION AND DEPLOYMENT OF DIGITAL AVATAR ASSETS

(71) Applicant: NVIDIA Corporation, Santa Clara, CA (US)

(72) Inventors: Pascal Joël Bérard, Zürich (CH); Christian Eduard Schueller, Frauenfeld (CH); Riccardo Roveri, Zug (CH); Severin Klingler, Bern (CH)

(73) Assignee: NVIDIA Corporation, Santa Clara, CA (US)

( * ) Notice: Subject to any disclaimer, the term of this patent is extended or adjusted under 35 U.S.C. 154(b) by 186 days.

(21) Appl. No.: 18/309,967

(22) Filed: May 1, 2023

(65) Prior Publication Data

US 2024/0370233 A1     Nov. 7, 2024

(51) Int. Cl.
*G06F 9/44*          (2018.01)
*G06F 8/34*          (2018.01)
(Continued)

(52) U.S. Cl.
CPC ................ *G06F 8/34* (2013.01); *G06F 9/453* (2018.02); *G06F 9/4806* (2013.01); (Continued)

(58) Field of Classification Search
CPC ...... G06F 9/453; G06F 9/4806; G06F 9/5038; G06F 9/04; G06F 8/34
See application file for complete search history.

(56) References Cited

U.S. PATENT DOCUMENTS

2013/0227583 A1*   8/2013   Gargash ................ G06F 9/4893
                                                                718/104
2019/0188788 A1    6/2019   Baker, IV et al.
(Continued)

FOREIGN PATENT DOCUMENTS

WO        2024064249 A1     3/2024

OTHER PUBLICATIONS

"Comfyanonymous," ComfyUI, Jan. 2023, 9 Pages. GitHub Version released Apr. 30, Retrieved on Online URL: https://github.com/comfyanonymous/ComfyUI/tree/b04e16ef5a7cd9cbf80d272a455bd34e869a6ec8.
(Continued)

*Primary Examiner* — Bradley A Teets
*Assistant Examiner* — Lenin Paulino
(74) *Attorney, Agent, or Firm* — Lowenstein Sandler LLP

(57)          ABSTRACT

Disclosed are systems and techniques for configuring multi-modal digital avatar (DA) resources. The techniques include selecting a plurality of multi-modal DA resources identifying, for a first multi-modal DA resource of the plurality of multi-modal DA resources, at least a first modal input event and a second modal input event, and generating a graph that defines an execution flow for the plurality of multi-modal DA resources. The graph includes nodes comprising a first node associated with a first DA resource, a second node associated with a second multi-modal DA resource, and a third node associated with a third multi-modal DA resource. The graph includes a plurality of directed edges, including a first directional edge associated with a transition of the execution flow from the first node to the second node conditioned on an event handler of the first node responding to an occurrence of the first modal input event.

19 Claims, 22 Drawing Sheets

(51) Int. Cl.

| | | |
|---|---|---|
| *G06F 9/451* | (2018.01) | |
| *G06F 9/48* | (2006.01) | |
| *G06F 9/50* | (2006.01) | |
| *G06F 9/448* | (2018.01) | |
| *G06F 9/54* | (2006.01) | |

(52) U.S. Cl.

CPC .......... *G06F 9/5038* (2013.01); *G06F 9/4498* (2018.02); *G06F 9/542* (2013.01)

(56) References Cited

U.S. PATENT DOCUMENTS

| | | | |
|---|---|---|---|
| 2021/0117681 A1* | 4/2021 | Poddar .................... | G10L 15/22 |
| 2021/0342552 A1 | 11/2021 | Mishra et al. | |
| 2021/0358188 A1 | 11/2021 | Lebaredian et al. | |
| 2022/0261631 A1 | 8/2022 | Cohen et al. | |
| 2022/0261662 A1* | 8/2022 | Chandrasekar .......... | G06N 5/02 |
| 2023/0064049 A1 | 3/2023 | Sivaraman et al. | |
| 2023/0092274 A1 | 3/2023 | Rodrigo Cavalin et al. | |
| 2023/0186161 A1 | 6/2023 | Arthur et al. | |
| 2023/0237277 A1 | 7/2023 | Reza et al. | |
| 2023/0289817 A1 | 9/2023 | Ashby | |
| 2023/0316615 A1 | 10/2023 | Xie et al. | |
| 2023/0342559 A1 | 10/2023 | Bhardwaj et al. | |
| 2023/0359470 A1* | 11/2023 | Lindsay ............. | G06Q 10/1057 |
| 2023/0410798 A1* | 12/2023 | Greborio ................. | G10L 15/22 |
| 2024/0111960 A1 | 4/2024 | Earle et al. | |
| 2024/0385885 A1* | 11/2024 | Dhillon ................. | G06F 9/5027 |

OTHER PUBLICATIONS

"README.md" from ComfyUI Version Released Apr. 30, 2023 with Paragraph Numbers Added for Reference. 8 Pages.

\* cited by examiner

Questionnaire Dialog 710

Question 720A

| | |
|---|---|
| Answer Choice 730A | Answer Choice 730C |
| Answer Choice 730B | Answer Choice 730D |

Question 720B

| | |
|---|---|
| Answer Choice 730A | Answer Choice 730C |
| Answer Choice 730B | Answer Choice 730D |

Question 720C

| | |
|---|---|
| Answer Choice 730A | Answer Choice 730C |
| Answer Choice 730B | Answer Choice 730D |

Cancel Button 740          Submit Button 750

800

900

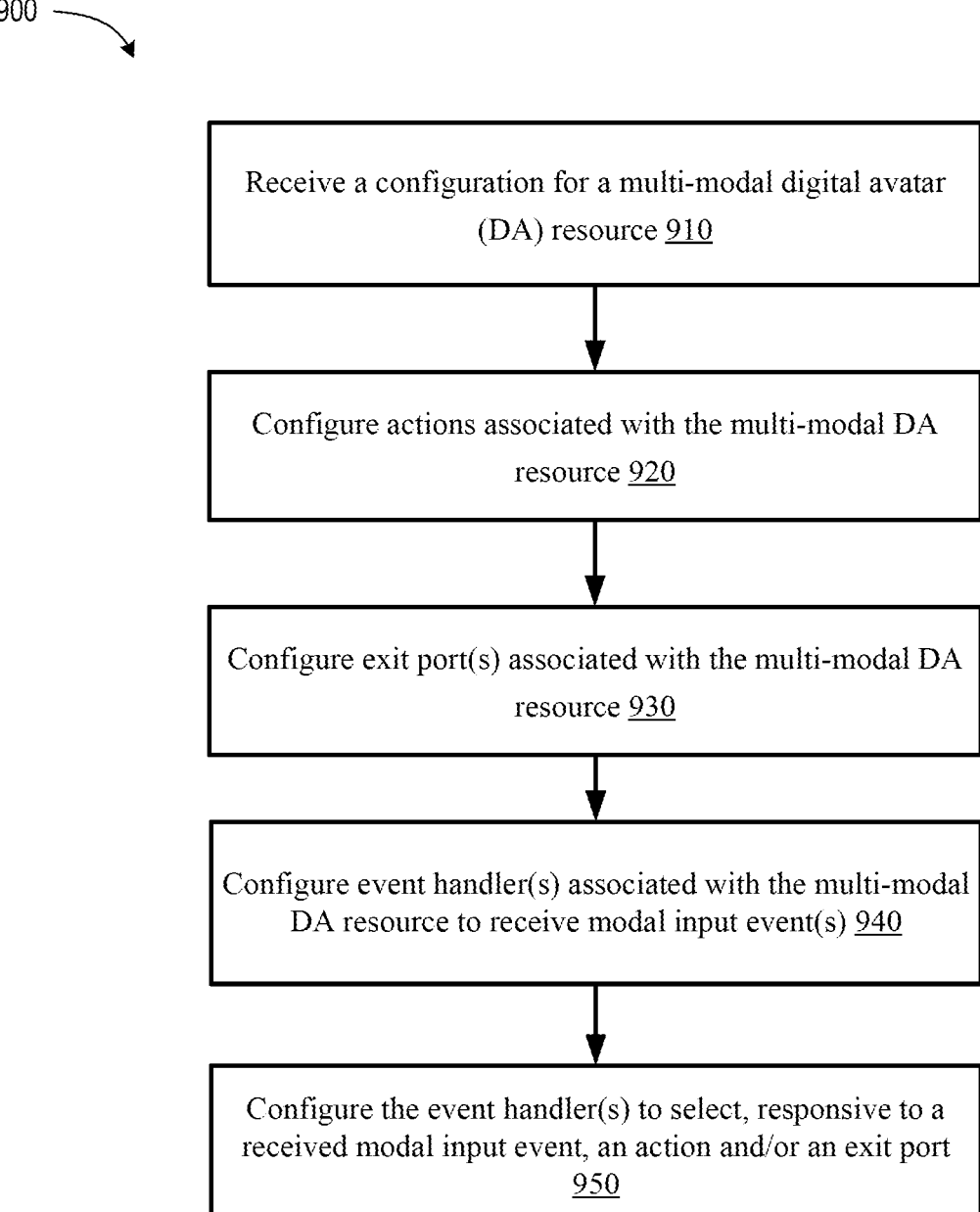

Receive a configuration for a multi-modal digital avatar
(DA) resource 910

Configure actions associated with the multi-modal DA
resource 920

Configure exit port(s) associated with the multi-modal DA
resource 930

Configure event handler(s) associated with the multi-modal
DA resource to receive modal input event(s) 940

Configure the event handler(s) to select, responsive to a
received modal input event, an action and/or an exit port
950

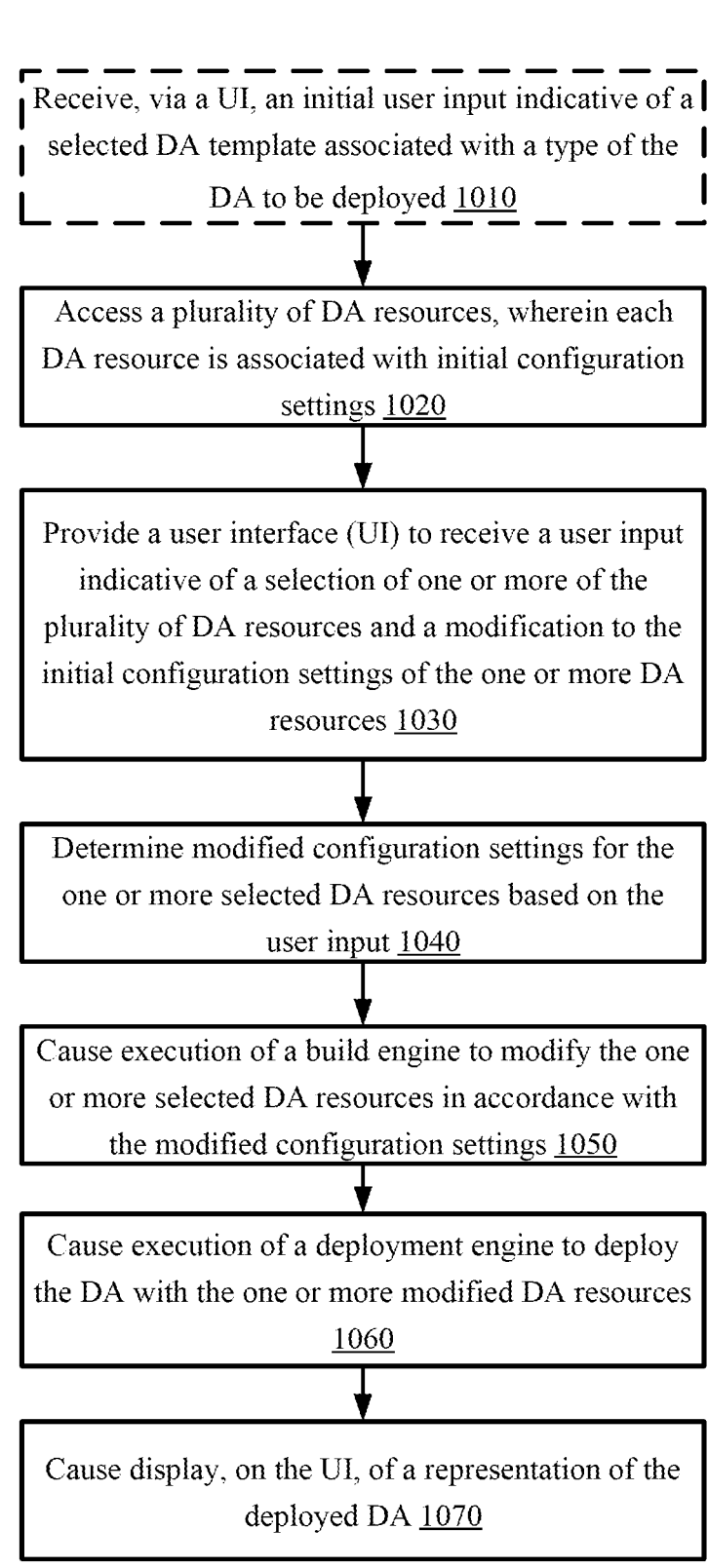

Receive, via a UI, an initial user input indicative of a selected DA template associated with a type of the DA to be deployed 1010

Access a plurality of DA resources, wherein each DA resource is associated with initial configuration settings 1020

Provide a user interface (UI) to receive a user input indicative of a selection of one or more of the plurality of DA resources and a modification to the initial configuration settings of the one or more DA resources 1030

Determine modified configuration settings for the one or more selected DA resources based on the user input 1040

Cause execution of a build engine to modify the one or more selected DA resources in accordance with the modified configuration settings 1050

Cause execution of a deployment engine to deploy the DA with the one or more modified DA resources 1060

Cause display, on the UI, of a representation of the deployed DA 1070

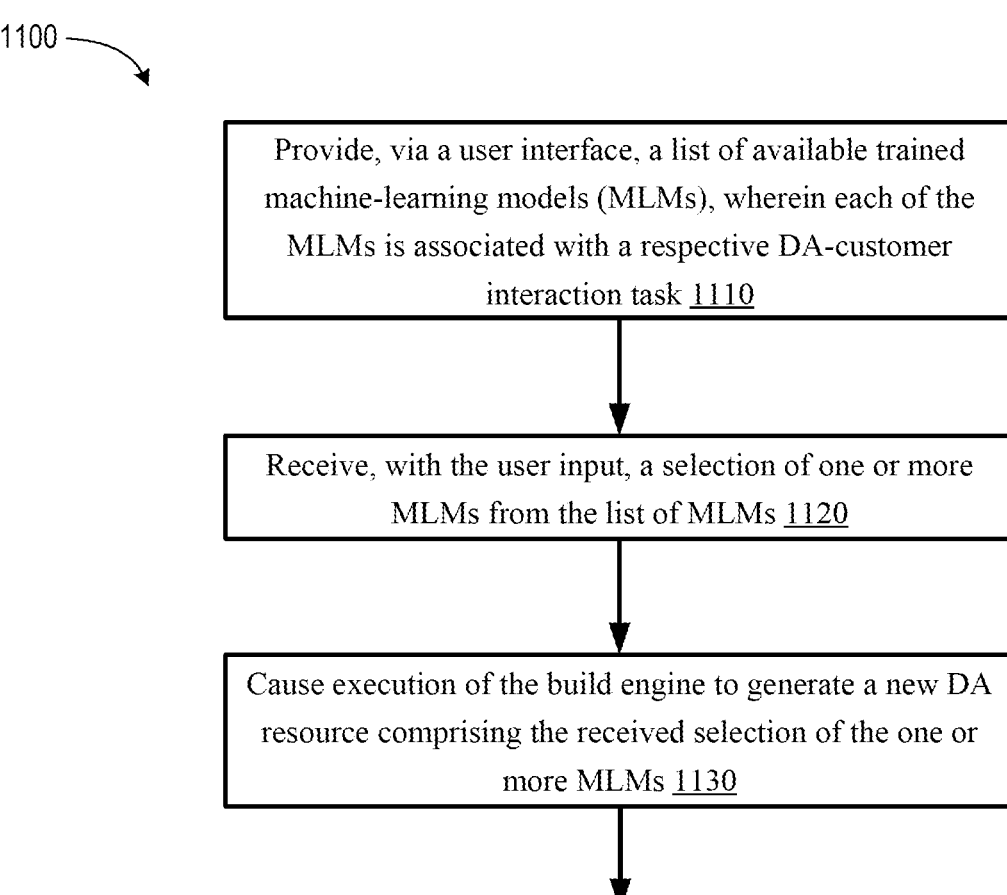

Provide, via a user interface, a list of available trained machine-learning models (MLMs), wherein each of the MLMs is associated with a respective DA-customer interaction task 1110

Receive, with the user input, a selection of one or more MLMs from the list of MLMs 1120

Cause execution of the build engine to generate a new DA resource comprising the received selection of the one or more MLMs 1130

Cause execution of the deployment engine to include the new DA resource into the deployed DA 1140

FIG. 11

1300
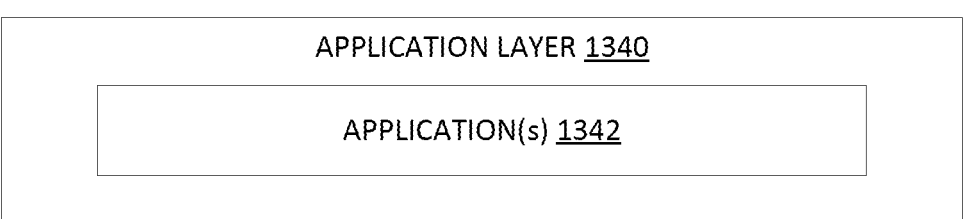
APPLICATION LAYER 1340
APPLICATION(s) 1342
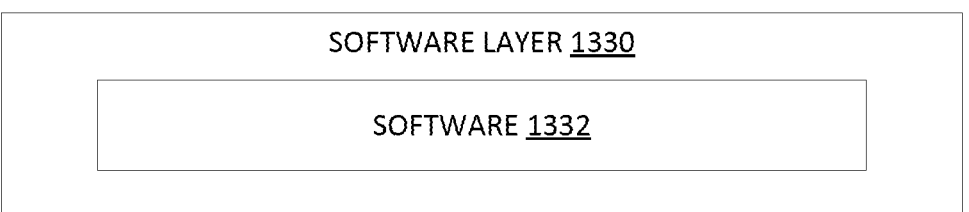
SOFTWARE LAYER 1330
SOFTWARE 1332
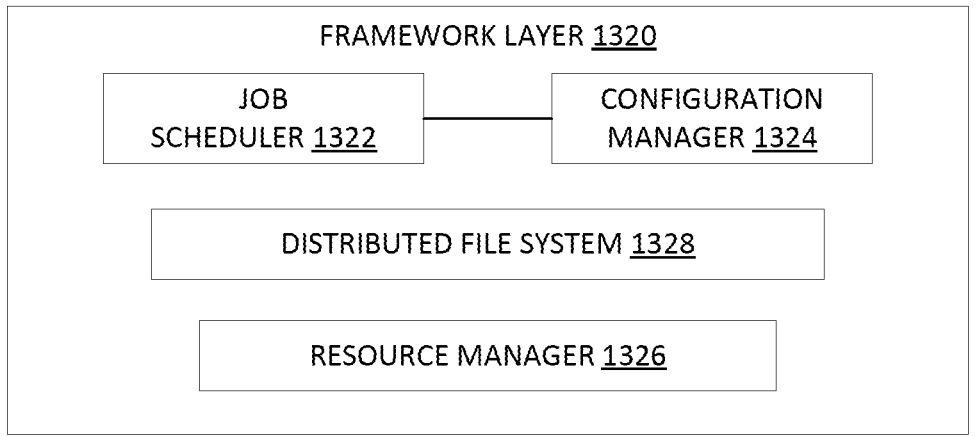
FRAMEWORK LAYER 1320
| JOB SCHEDULER 1322 | CONFIGURATION MANAGER 1324 |
DISTRIBUTED FILE SYSTEM 1328
RESOURCE MANAGER 1326
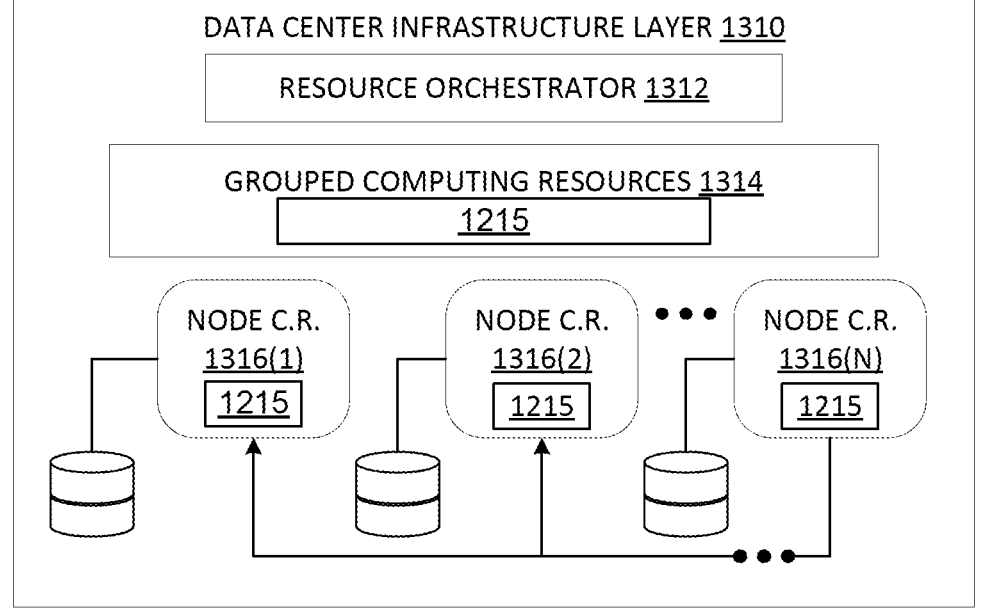
DATA CENTER INFRASTRUCTURE LAYER 1310
RESOURCE ORCHESTRATOR 1312
GROUPED COMPUTING RESOURCES 1314
1215
NODE C.R. 1316(1)
1215
NODE C.R. 1316(2)
1215
• • •
NODE C.R. 1316(N)
1215
FIG. 13

PROCESSOR 1402

1215

EXECUTION UNIT 1408

CACHE 1404

REGISTER FILE 1406

PACKED INSTRUCTION SET 1409

PROCESSOR BUS 1410

GRAPHICS/ VIDEO CARD 1412

1414

MEMORY CONTROLLER HUB 1416

1418

MEMORY 1420

INSTRUCTION(S) 1419

DATA 1421

1422

DATA STORAGE 1424

I/O CONTROLLER HUB 1430

LEGACY I/O CONTROLLER 1423

USER INPUT INTERFACE 1425

WIRELESS TRANSCEIVER 1426

SERIAL EXPANSION PORT 1427

FLASH BIOS 1428

AUDIO CONTROLLER 1429

NETWORK CONTROLLER 1434

1400

1800

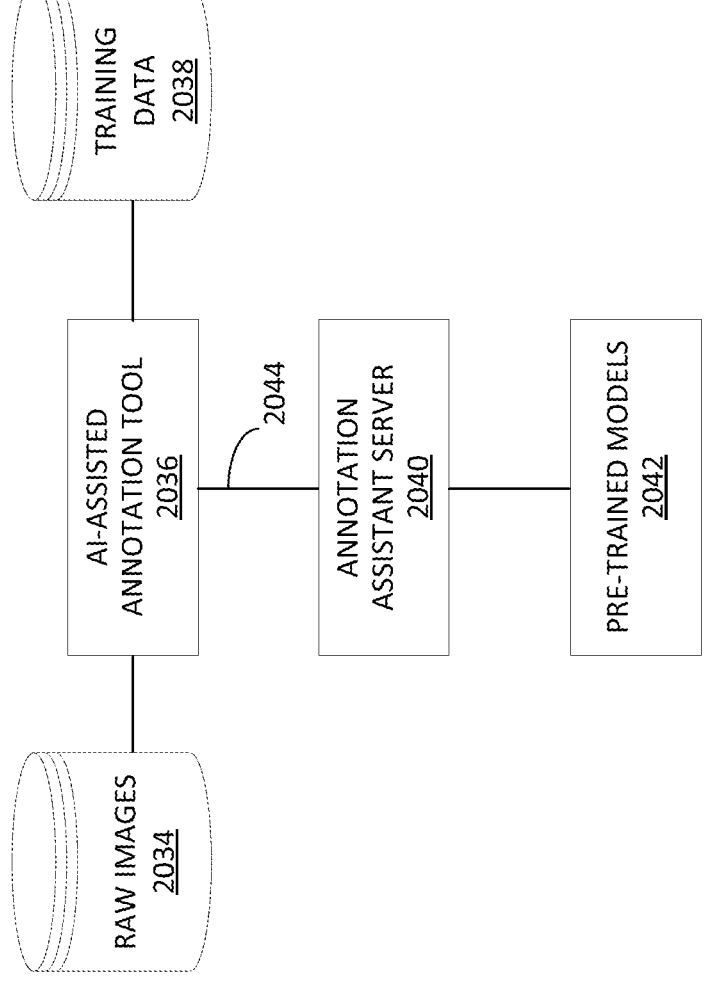
FIG. 20B

CONFIGURATION AND DEPLOYMENT OF DIGITAL AVATAR ASSETS

TECHNICAL FIELD

At least one embodiment pertains to a graphical user interface and system used to configure a digital avatar that will interact with human users.

BACKGROUND

Digital avatars are computer systems configured to interact with human users. A digital avatar can be represented using animated graphics on a digital screen and can communicate to human users using sounds and information displayed on the screen. A human user may be able to interact with the digital avatar using voice commands, gestures, and/or touchscreen interfaces. Digital avatars may be used to assist users in completing electronic tasks, such as finding answers to frequently asked questions (FAQs), ordering products from an online store, or making a reservation at a restaurant or hotel. Creating a digital avatar that can react to a variety of user inputs and interactions often requires complex, case-specific computer programs and configurations.

BRIEF DESCRIPTION OF DRAWINGS

FIG. 9 is a flow diagram of an example method of configuring a new digital avatar resource for deployment in a digital avatar, according to at least one embodiment;

FIG. 10 is a flow diagram of an example method of configuring and deploying a digital avatar, according to at least one embodiment;

FIG. 11 is a flow diagram of an example method of generating a new digital avatar resource for deployment in a digital avatar, according to at least one embodiment;

FIG. 13 illustrates an example data center system, according to at least one embodiment;

FIGS. 20A and 20B illustrate a data flow diagram for a process to train a machine learning model, as well as client-server architecture to enhance annotation tools with pre-trained annotation models, in accordance with at least one embodiment.

DETAILED DESCRIPTION

Figure 1:
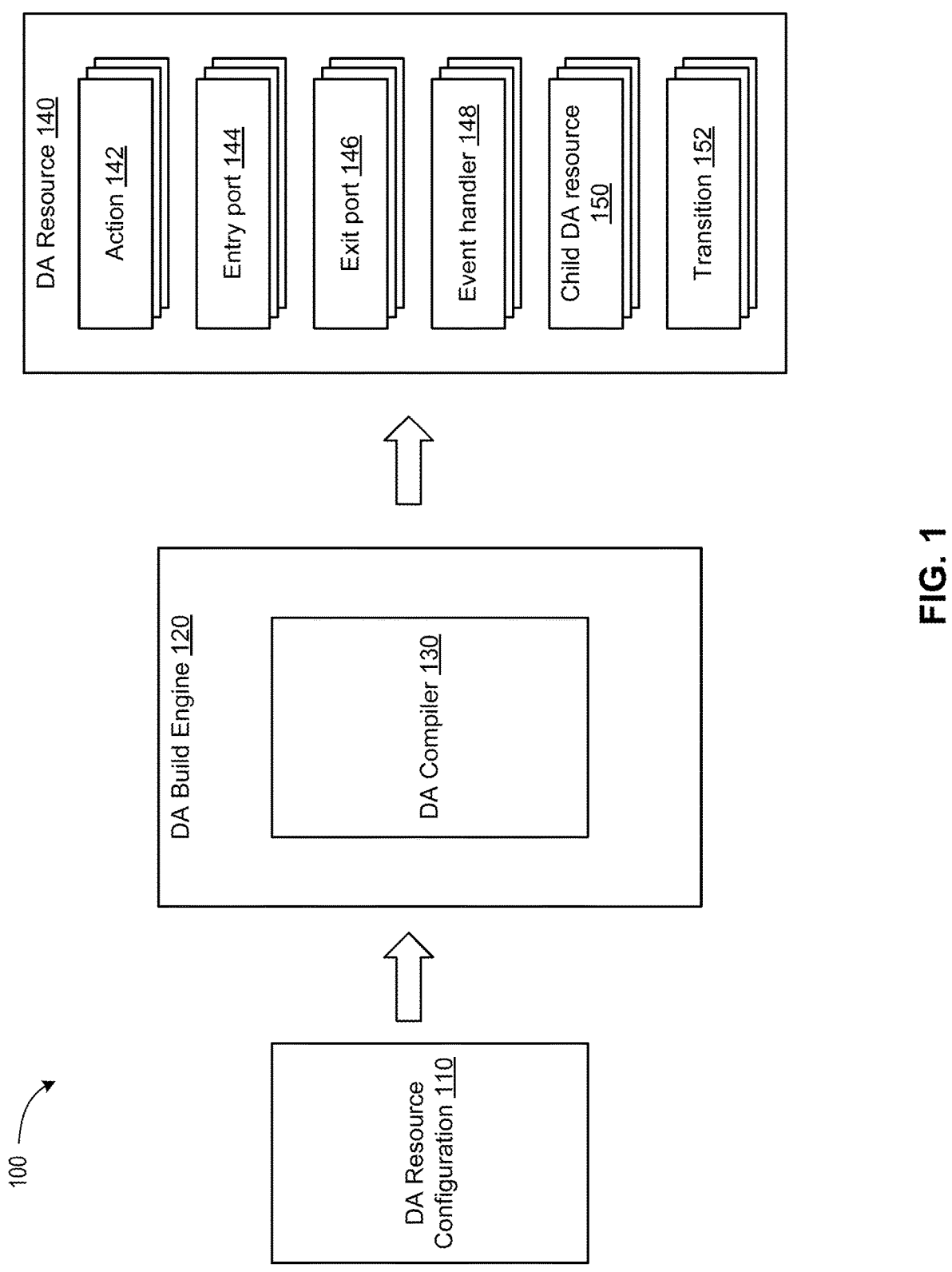
FIG. 1 illustrates an example process for generating a digital avatar resource, according to at least one embodiment.

Due to the complexities inherent in human interactions, creating a digital avatar that simulates, understands, and responds to those complexities requires advanced computer programs. In the past, developers would spend time creating a unique digital avatar for each use case, such as one avatar for answering FAQs and another avatar for placing an online order. With the advance of machine learning and artificial intelligence, sophisticated digital avatars can be created that respond to a variety of inputs and can perform multiple tasks. While such a multi-task avatar can be used in a variety of situations, configuring the avatar to handle each situation requires significant development efforts. For example, configuring the avatar may include creating a unique set of FAQs and/or a unique set of products available to order. Because these digital avatars are often difficult to configure and tend to require low-level code changes, digital avatar creators usually have to team up with computer programmers to configure the avatar for each use case. This makes digital avatars difficult to design and costly to deploy.

Aspects and embodiments of the present disclosure address these and other technological challenges by providing a system-such as a software development kit (SDK)-that includes tools or features for creating computing codes that may be used for efficient creation and deployment of digital avatar (DA) systems and graphical user interfaces (GUIs) that allow for user interactivity with avatar-building platforms. The disclosed SDK and GUIs abstract away many of the complexities that underlie designing and configuring digital avatars (DAs). The disclosed implementations allow DA creators to configure DA resources for avatar-building platforms. The configured DA resources can then be used to configure, via the GUIs disclosed herein, sophisticated DAs that can interpret voice commands, speaker intents, gestures, facial expressions, touch inputs, and/or other multi-modal inputs from human users and respond with text or speech, animations, sound effects, graphical displays, light effects, and/or other multi-modal outputs.

The disclosed SDK enables a DA creator to create various multi-modal DA resources to be available on avatar-building platforms. For example, a multi-modal DA resource may include one or more artificial intelligence (AI) models or machine-learning models (MLMs) trained to perform various tasks, such as speech recognition, voice recognition, computer vision, motion detection, pattern detection, and/or the like. A multi-modal DA resource may also include one or more systems capable of converting text to speech, animating graphics, gathering and analyzing analytics, and the like. The disclosed GUIs enable a DA creator to access and configure various multi-modal DA resources of the avatar-building platforms. A multi-modal DA resource may receive multi-modal inputs and may generate multi-modal outputs. For example, a multi-modal DA resource may be configured to receive an audio-mode event, a motion-mode event, and/or a tactile-mode event as inputs. The multi-modal DA resource may be configured to generate, in response to one or more received events, an audio-mode output, an animation-mode output, a graphic-mode output, a text-mode output, and/or a physical-mode output. References to a "DA resource" throughout this disclosure should normally be understood to be referring to a multi-modal DA resource although some of DA resources may be single-modal DA resources.

The disclosed SDK may enable a DA creator to add a set of behaviors (e.g., event handlers, nested DA nodes, action, etc.) to one or more DA nodes. For example, a DA creator may want to add FAQ handling behaviors to various DA nodes. Instead of adding all of the corresponding event handlers and nested DA nodes one-by-one to each of the various DA nodes, the SDK may allow the DA creator to simultaneously add the set of behaviors to multiple DA nodes. In some embodiments, the set of behaviors will augment the configuration of a DA node. In some embodiments, the set of behaviors will override part or all of the configuration of a DA node.

In order to abstract away the complexities contained in a hierarchy of DA nodes, a DA creator can build a DA resource based on the hierarchy of DA nodes and can choose a subset of the features of the parent DA node to expose within the DA resource. For a non-limiting example, a DA resource may have 1 entry port, 3 exit ports, and 2 public node properties that are visible to and configurable by a DA creator. Within the DA resource (and hidden from the DA creator) may be multiple nested DA nodes with various entry/exit ports, transitions, and node properties. In some embodiments, a DA resource may be referred to as a story node. The story node may encapsulate an episode of a DA-user interaction. After creation, the story node may be provided to the disclosed GUI to be included in the DA system.

The advantages of the disclosed techniques include but are not limited to providing digital-avatar-resource-creation tools to DA creators that abstract away the complexities related to understanding and responding to human interactions. By connecting DA nodes in a tree and configuring properties for individual DA nodes, a DA creator can configure a reusable DA resource that can respond to human interactions in a variety of scenarios. The advantages also include allowing DA creators to configure sophisticated DAs using drag-and-drop story nodes connected in a graph. Each story node abstracts away the complexities related to understanding and responding to human interactions and provides configurable properties to the DA creator. By connecting story nodes in a graph and configuring properties of each story node, a DA creator can quickly configure a sophisticated DA to respond to human interactions in a variety of scenarios.

System Architecture

FIG. 1 illustrates an example process 100 for generating a digital avatar (DA) resource, according to at least one embodiment. DA resource configuration 110 may be provided to DA build engine 120, which may include DA compiler 130. DA compiler 130 may generate, based on DA resource configuration 110, DA resource 140. DA resource configuration 110 may include configuration parameters for one or more actions 142 of DA resource 140. Actions 142 may include multi-modal output actions, such as an audio-mode output action, an animation-mode output action, a graphic-mode output action, and/or a text-mode output action. Actions 142 may also include an action that includes transferring execution control to another multi-modal DA resource. DA resource configuration 110 may include configuration parameters for one or more entry ports 144 and/or exit ports 146. Entry ports 144 and/or exit ports 146 of DA resource 140 may allow transitions to entry ports/exit ports of other DA resources. DA resource configuration 110 may include configuration parameters for one or more event handlers 148 of DA resource 140. Event handlers 148 may be configured to monitor and/or react to multi-modal input events. For example, event handlers 148 may each be configured to react to a predetermined event. Individual modal input events may be associated with an event type, such as an audio-mode event (e.g., a user speaking into a microphone), a motion-mode event (e.g., a user moving in front of a sensor), and/or a tactile-mode event (e.g., a user interacting with a touchscreen device). DA resource configuration 110 may include configuration parameters for one or more child DA resource 150 of DA resource 140. Child DA resource 150 may be nested within DA resource 140. In some embodiments, child DA resource 150 further includes one or more nested DA resources. DA resource configuration 110 may include configuration parameters for one or more transitions 152 within DA resource 140. Transitions 152 may connect one or more components (e.g., actions 142, entry ports 144, exit ports 146, event handlers 148, child DA resources 150) within DA resource 140.

Figure 2:
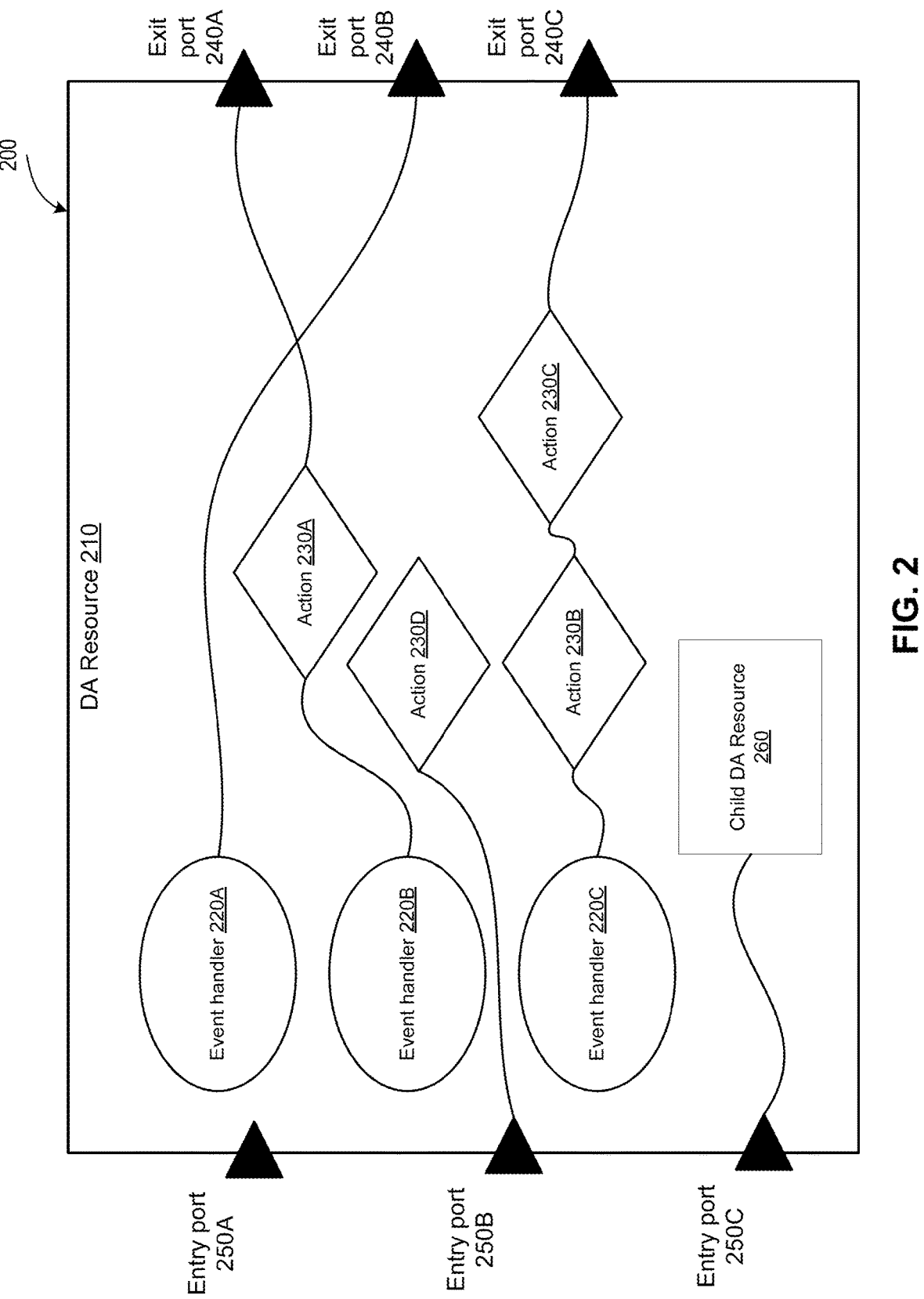
FIG. 2 illustrates a representation of an example digital avatar resource, according to at least one embodiment.

FIG. 2 illustrates a representation 200 of an example digital avatar resource 210, according to at least one embodiment. In some embodiments, DA resource 210 may include event handlers 220A-C. Individual event handlers may be configured to select an action or an exit port of DA resource 210 responsive to receiving a single- or multi-modal input event. For example, event handler 220A may be configured to transfer execution control to exit port 240B responsive to receiving an audio-mode input event. Event handler 220B may be configured to select action 230A responsive to receiving a motion-mode input event. Event handler 220C may be configured to select action 230B responsive to receiving a tactile-mode input event. Action 230A may be configured to modify a property of DA resource 210 (e.g., a state modification action) and may transfer execution control to exit port 240A. Action 230B may be configured to modify a property shared between multiple DA resources (e.g., a continuous property) and may transfer execution control to action 230C. Continuous properties may exist outside of the lifetime of an individual node and may be shared between two (or more) nodes. Action 230C may be configured to modify a property of an additional multi-modal DA resource (e.g., parent DA resource of DA resource 210) and may transfer execution control to exit port 240C.

DA resource 210 may include entry ports 250A-C. In some embodiments, an entry port (e.g., entry port 250A) may be used to transfer execution control to a story node and may not include any transitions within the story node. In some embodiments, an entry port (e.g., 250B) may be connected via a transition directly to an action (e.g., action 230D). In some embodiments, an entry port (e.g., entry port 250C) may be connected via a transition directly to a nested story node (e.g., child DA resource 260). In some embodiments, when a component of a DA resource (e.g., action 230D, child DA resource 260) does not have a transition connected to an exit port, execution control may transfer to the parent DA resource (e.g., DA resource 210) after execution of the component.

In some embodiments, a DA resource generated using the disclosed SDK may include a DA node. The DA node may include event handlers, actions, flow control elements, and/ or node properties. The event handlers of the DA node may be configured to respond to events generated by the DA system or other DA nodes. Events may be generated by input devices of the DA system, processes running on the DA system, other systems interacting with the DA system (e.g., via an API of the DA system), and/or other DA nodes. For example, the DA node may have a "user approach" event handler configured to perform an action (e.g., transition to a different DA node, change a value of a node property, etc.) in response to an input device of the DA system (e.g., camera, radar, motion sensor, load sensor, or the like) detecting a user has approached the DA. An event handler may also react to numerous other events including, but not limited to, a timer event, a speech intent event, a gesture event, and/or an input event. Individual events may include attributes related to the events. For example, an input event may have a type attribute. Types of input events may include a visual type (e.g., an event from a camera), physical type (e.g., an event from a button, touchscreen, or load sensor), or audial type (e.g., an event from a microphone), and so on. Events may also include data associated with the event. For example, a physical input event may include coordinates of a touchscreen device where the input was received. An event handler of the DA node may be configured to react to events that match one or more criteria (e.g., based on an attribute and/or data of the event).

An event handler may be configured to execute one or more actions in response to receiving the event. Actions may include modifying a value of a node property, transitioning to a different DA node, changing a state of a DA node (e.g., from active to sleeping), emitting events that other event handlers may react to, and/or interacting with another process or system. The action may include part (or all) of the data associated with the event that triggered the action. In some embodiments, an event handler may react to an event if a state of the DA node is active. In some embodiments, an event handler may react to an event if the state of the DA node is active or sleeping.

Individual DA nodes may include node properties that store configurations of the DA node. A runtime state of the DA node may be stored in a node property during execution of the DA node. Node properties may be public (e.g., accessible by other DA nodes) or private (e.g., accessible only by the corresponding DA node). Node properties may initially be configured with a default value. In some embodiments, the default value of a node property may be overridden by a related (e.g., parent) DA node.

Individual DA nodes may have entry ports and/or exit ports. A DA node may be connected to another DA node through the ports. For example, a first DA node may have an exit port that is connected to a second DA node's entry port. The second DA node may be a sibling of the first DA node (e.g., both the first DA node and the second DA node are nested within the same parent DA node) or unrelated to the first DA node. By connecting DA nodes together, a tree (e.g., hierarchy) of DA nodes can be created. In some embodiments, one branch of the tree may be active at a time while other branches of the tree may be asleep or inactive. In some embodiments, all event handlers of DA nodes in the active branch of the tree may respond to events. A subset of event handlers of DA nodes in an asleep branch of the tree may respond to events. The event handlers of DA nodes in an inactive branch of the tree may not respond to events. A branch of the tree can become active by transitioning from an active DA node to a sleeping (or inactive) DA node, the previously active DA node becoming inactive (or sleeping) and the previously sleeping (or inactive) DA node becoming active. A DA node can transition to a different DA node if an exit port of the first DA node is connected to an entry port of the second DA node.

For example, a graph may include a first node, a second node, a third node, and a fourth node. The second node may be the starting node of a first branch (e.g., an active branch). The third node may be the starting node of a second branch (e.g., a sleeping branch). The fourth node may be the starting node of a third branch (e.g., an inactive branch). An exit port of the first node may be connected to an entry port of each of the second node, the third node, and the fourth node. By combining various DA nodes to create a tree of DA nodes, a developer can create a sophisticated DA resource that can respond to a variety of user actions and can be used in an avatar-building platform.

In some embodiments, a DA node may also include nested DA nodes. For example, a "parent" DA node may include one or more "children" DA nodes. In some embodiments, when both the parent DA node and a child DA node have an event listener listening for the same event, the event listener of the child DA node will have precedence over the event handler of the parent DA node. When a child DA node is in an active state, the parent DA node may also be in an active state. A parent DA node may include a transition to a child DA node. In some embodiments, the child DA node may further include one or more nested DA nodes. A parent DA node may interrupt execution of a child DA node and transition to a different DA node. The different DA node may be another child DA node of the parent DA node or an unrelated DA node. When transitioning to a different child DA node, the parent DA node may change the state of the executing child node to sleeping or inactive. A DA node may be configured such that transitioning (e.g., entering/exiting the node) triggers one or more actions to execute. In some embodiments, DA nodes may interact with properties of the DA system. For example, before becoming inactive, a DA node may store the value of one or more node properties in a property of the DA system. Upon being activated, the DA node may retrieve the value of the one or more node properties from the property of the DA system and modify the values of the node properties of the DA node.

In some embodiments, a DA node may have more than one region. Each region of the DA node may include one or more DA nodes. Within each region, there may be an active DA node. Active DA nodes of one or more regions of a DA node may be configured to be executed in parallel by the DA system. Event handlers of a DA node may be assigned to a particular region of the DA node.

Figure 3:
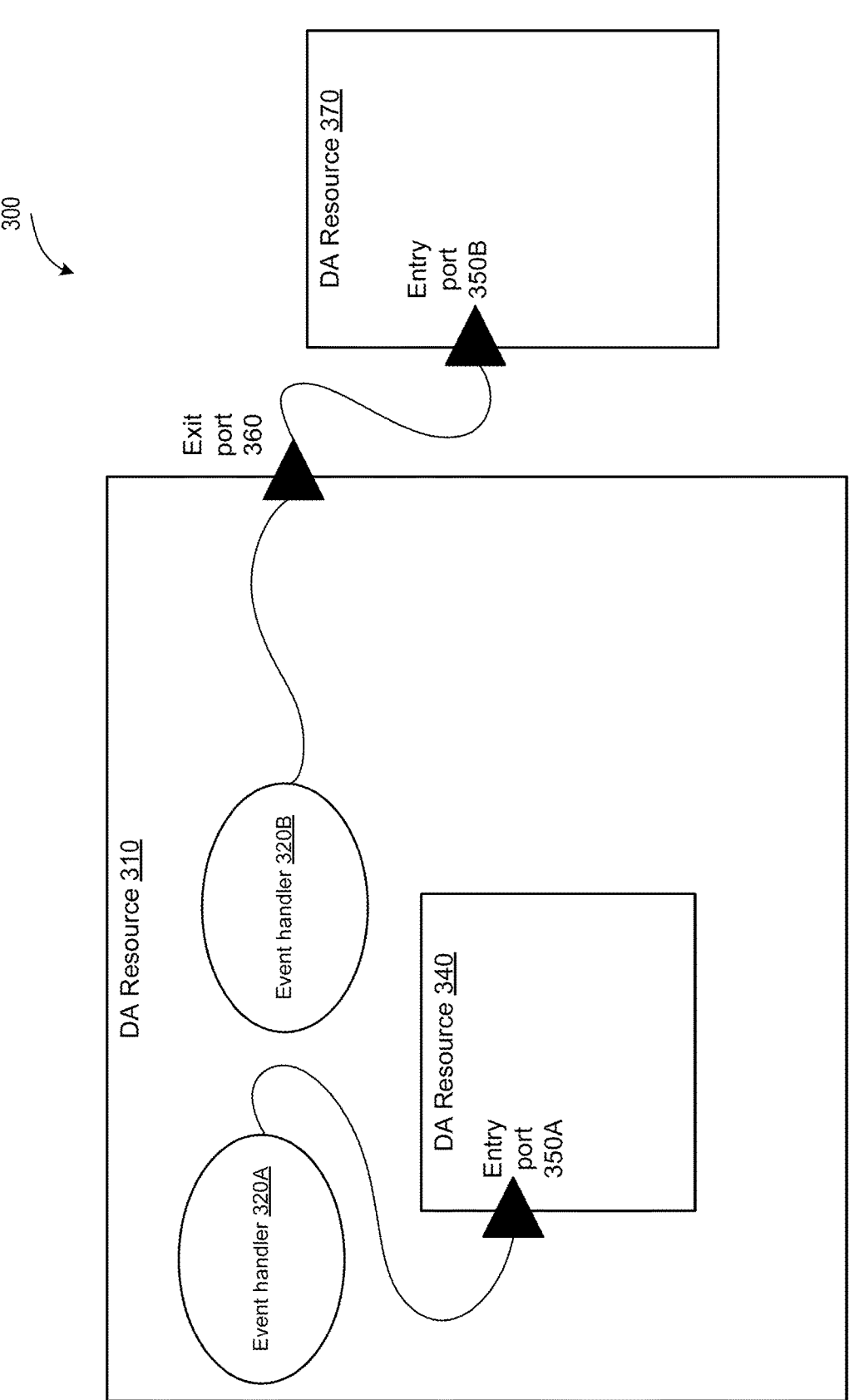
FIG. 3 illustrates a representation of an example execution flow of a digital avatar resource, according to at least one embodiment.

FIG. 3 illustrates a representation 300 of an example execution flow of a digital avatar resource 310, according to at least one embodiment. In some embodiments, DA resource 310 may include event handler 320A, event handler 320B, and exit port 360. Event handler 320A of DA resource 310 may be configured to transfer execution control to a child DA resource (e.g., DA resource 340) of DA resource 310 via entry port 350A responsive to receiving a modal input event that satisfies a criterion. For example, event handler 320A may be configured to transfer execution control responsive to receiving a tactile-mode input event if the tactile-mode input event includes data indicating that the input event (e.g., a user touching a touchscreen device) occurred within a predetermined region of the input device. Event handler 320B may be configured to transfer execution control to another DA resource (e.g., DA resource 370) via exit port 360 and entry port 350B. In some embodiments, event handler 320B may be conditioned on a state of the multi-modal DA resource satisfying an activation condition (e.g., the multi-modal DA resource being in an active state).

Figure 4:
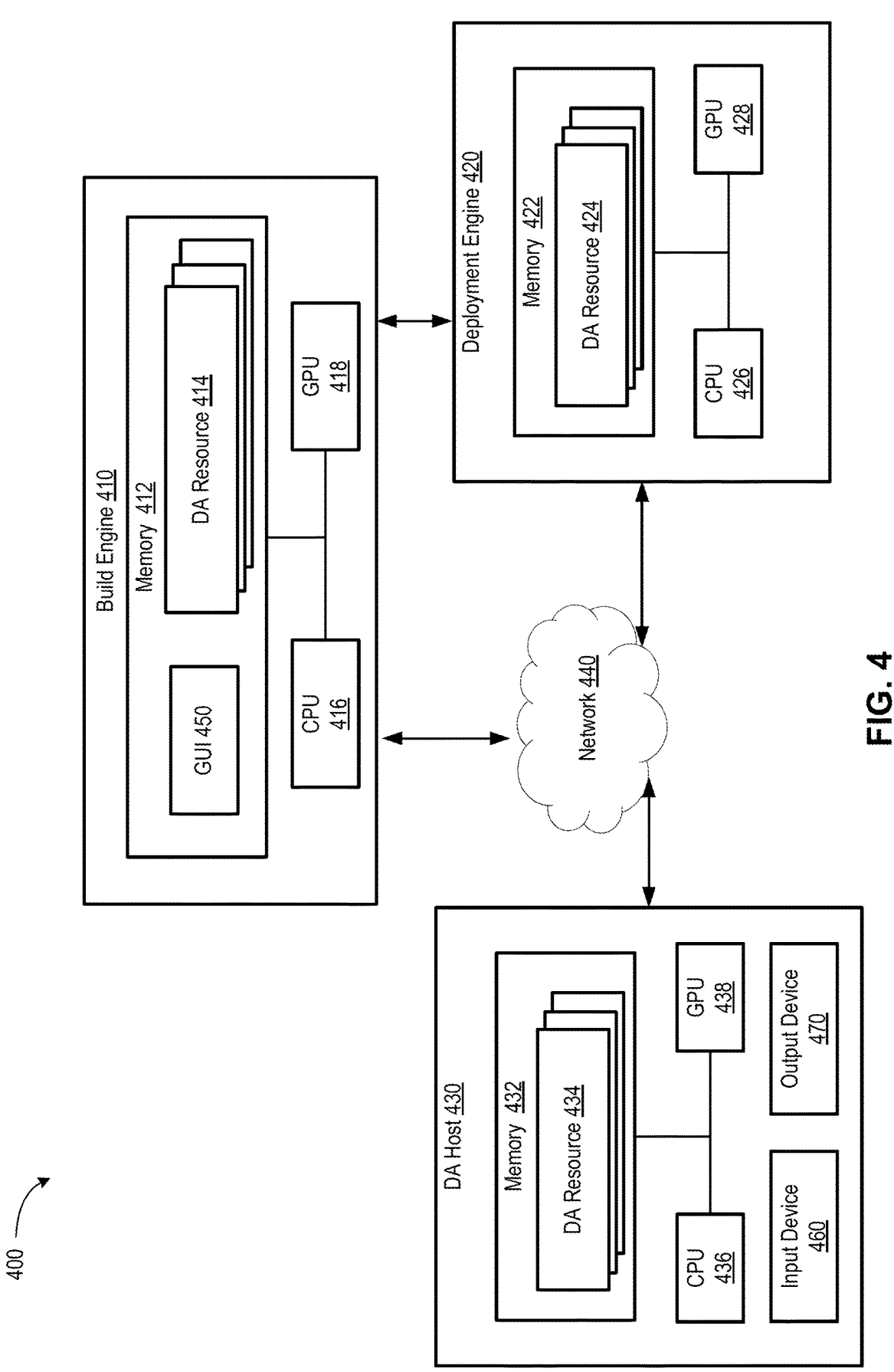
FIG. 4 is a block diagram of an example computer system capable of configuring and deploying a digital avatar, according to at least one embodiment.

FIG. 4 is a block diagram of an example computer system 400 capable of configuring and deploying a digital avatar, according to at least one embodiment. A computing system 400 may include a build engine 410, a deployment engine 420, and a DA host 430 connected to a network 440. Network 440 may be a public network (e.g., the Internet), a private network (e.g., a local area network (LAN), or a wide area network (WAN)), a wireless network, a personal area network (PAN), a combination thereof, and/or another network type.

Build engine 410 may be a desktop computer, a laptop computer, a smartphone, a tablet computer, a server, a wearable device, a virtual reality (VR)/augmented reality (AR)/mixed reality (MR) headset or heads up display, a digital avatar or chat bot kiosk, an in-vehicle infotainment computing device, and/or any suitable computing device capable of performing the techniques described herein. Build engine 410 may be configured to display graphical user interface (GUI) 450. GUI 450 may include graphical elements configured to allow modification of one or more DA resources 414.

Build engine 410 may include a memory 412 communicatively coupled with one or more processing devices, such as one or more graphics processing units (GPU) 418 and one or more central processing units (CPU) 416. Memory 412 may store one or more DA resources 114. At least one of DA resources 114 may include a trained machine learning model (MLM), which may be a natural language processing (NLP) model, a gesture recognition model, an emotion recognition model, a user tracking model, and/or the like. Any of DA resources 414, including any corresponding trained MLMs, may be executed using GPU 418 and/or CPU 416. In some embodiments, the MLMs may include one or more language models, such as Large Language Models (LLMs), that may be deployed within one or more DA resources in order to perform, for example and without limitation, NLP.

In at least one embodiment, some or all of trained MLMs of DA resources 414 may be implemented as deep learning neural networks having multiple levels of linear or non-linear operations. For example, some or all of trained MLMs of DA resources 114 may include convolutional neural layers, recurrent neural layers, fully connected neural networks, neural networks with memory layers/subnetworks, and so on. In at least one embodiment, some or all of trained MLMs of DA resources 414 may include multiple neurons wherein each neuron may receive its input from other neurons or from an external source and may produce an output by applying an activation function to the sum of weighted inputs and a bias value. In at least one embodiment, some or all of trained MLMs of DA resources 414 may include multiple neurons arranged in layers, including an input layer, one or more hidden layers, and an output layer. Neurons from adjacent layers may be connected by weighted edges. In some embodiments, build engine 410 may train a some or all of trained MLMs of DA resource 414. Build engine 410 may build (e.g., compile) DA resources 414 according to received DA configurations. DA configurations may be retrieved from memory 412 or received via network 440. After building DA resources 414, build engine 410 may provide DA resources 414 to deployment engine 420.

Deployment engine 420 may include a memory 422 communicatively coupled to one or more processing devices, such as CPU 426 and/or GPU 428. Memory 422 may store configured DA resources 424. Deployment engine 420 may provide a repository of configured DA resources 424 that are available to be used in a DA. For example, deployment engine 420 may provide some or all of configured DA resources 424 to DA host 430. DA host 430 may include a memory 432 communicatively coupled to one or more processing devices, such as CPU 436 and/or GPU 438. Memory 342 of DA host 430 may store deployed DA resources 434. DA host 430 may include one or more modal input devices 460 and one or more modal output devices 470. Input device 460 may include an audio-mode input device (e.g., a microphone), a motion-mode input device (e.g., a camera, a radar, a motion sensor, etc.), or a tactile-mode input device (e.g., a button, a touchscreen interface, a switch, etc.). Output device 470 may include an audio-mode output device (e.g., a speaker), a visual-mode output device (e.g., a monitor or digital display), or a physical-mode output device (e.g., a motor). In some embodiments, output device 470 is a visual-mode output device capable of displaying animation-mode outputs, graphic-mode outputs, and text-mode outputs. Deployed DA resources 434 may be executed by CPU 436 and/or GPU 438 to receive and react to events triggered by input device 460, as described herein. In some embodiments, build engine 410, deployment engine 420, and DA host 430 (or any combination thereof) may be a single computing device.

Figure 5:
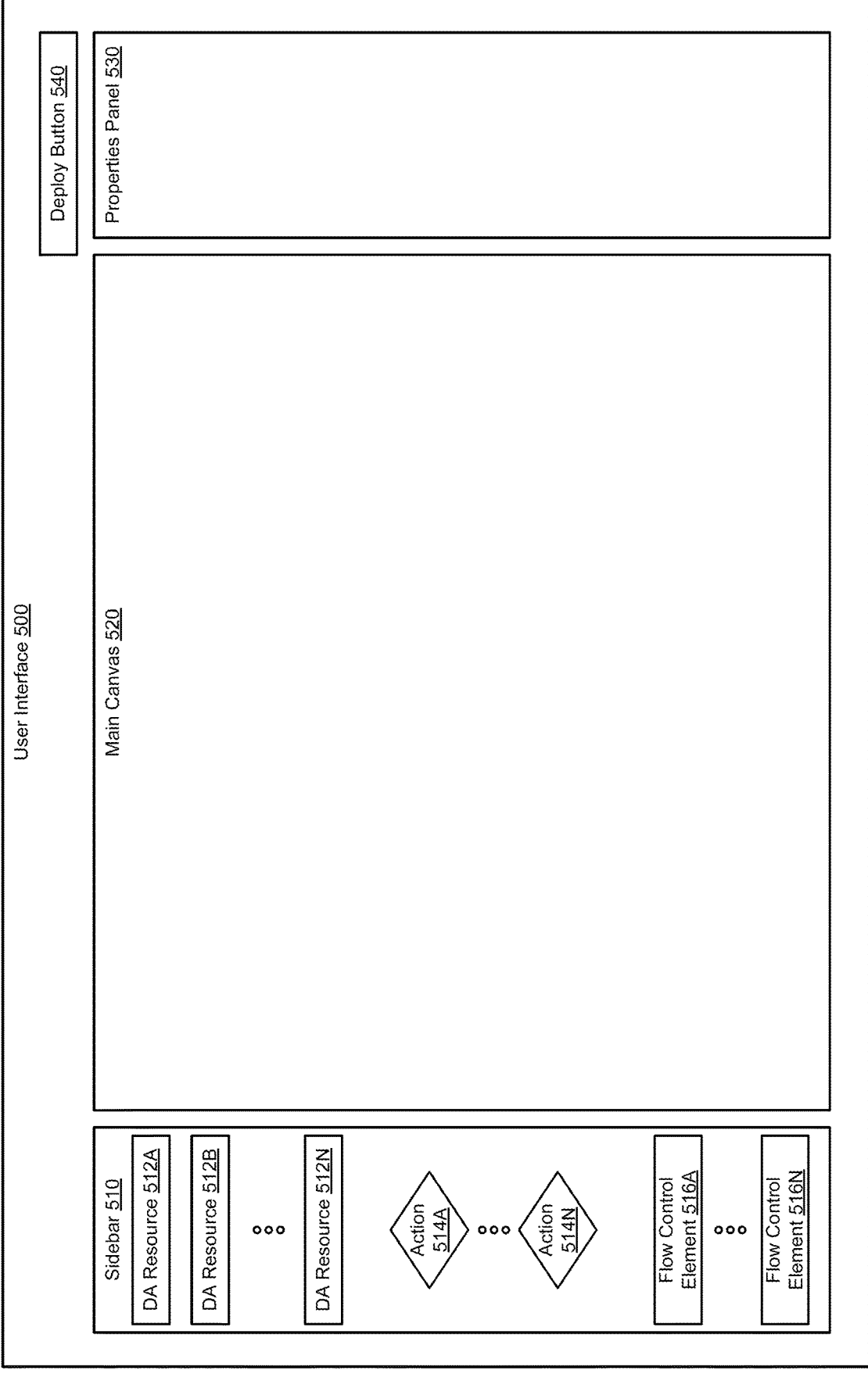
FIG. 5 illustrates an example user interface for configuring and deploying a digital avatar, according to at least one embodiment.

FIG. 5 illustrates an example user interface 500 for configuring and deploying a digital avatar, according to at least one embodiment. User interface 500 may include sidebar 510, main canvas 520, and properties panel 530. Sidebar 510 may include DA resources 512A-N. DA resources 512A-N may be story nodes created using the DA SDK as discussed above. Sidebar 510 may also include actions 514A-N. Sidebar 510 may also include flow control elements 516A-N. Main canvas 520 may be configured to receive one or more of DA resources 512A-N, actions 514A-N, or flow control elements 516A-N. A user may be able to drag-and-drop an element from sidebar 510 into main canvas 520. The element may expand in main canvas 520 to show additional details related to the element (e.g., properties, attributes, entry/exit ports, etc.). Properties panel 530 may be used to show one or more properties associated with an element in main canvas 520. In some embodiments, properties panel 530 may show one or more properties associated with a currently selected element in sidebar 510 (e.g., before it is dropped into main canvas 520). User interface 500 may include deploy button 540. Responsive to a user interacting with deploy button 540, the elements included in main canvas 520 may be compiled into a multi-modal DA resource bundle (e.g., by build engine 410 of FIG. 4). The compiled resource bundle may be provided to a repository of DAs that are ready for deployment (e.g., memory 422 of deployment engine 420 of FIG. 4). The multi-modal DA resource bundle may be executable by a computing device (e.g., DA host 430 of FIG. 4) and may include instructions that, when executed by the computing device, cause the computing device to respond to interactions with a user.

In some embodiments, a GUI for avatar creation may include a sidebar, a main canvas area, and a properties panel. Included in the sidebar may be various selectable resources, such as story nodes or any other DA resources, each of which is targeted to perform a specific task of the DA-user interaction. For example, one of the story nodes in the sidebar may be an "approach" story node. An "approach" story node may allow a DA creator to configure the DA to encourage users to approach the DA and begin an interaction. Other story nodes that may be displayed in the sidebar include an information story node, a barcode (e.g., quick response (QR) code) story node, a single-choice story node, a multiple-choice story node, a speaking story node, or a listening story node. In some embodiments, each type of story node may have a unique appearance (e.g., icon, color, shape, etc.). Some or all story nodes may include one or more properties that can be configured by a DA creator and/or modified by story nodes during a DA-user interaction.

The sidebar may include selectable flow control elements. The selectable flow control elements may include transitions, branching elements, source elements, sink elements, entry ports, and exit ports. Transitions may connect an exit port of a first node ("source node") to an entry port of a second node ("destination node"). In some embodiments, individual transitions may have a corresponding mode indicating either a hard transition (which puts the source story node in an inactive state) or a soft transition (which puts the source story node in a sleeping state). In some embodiments, a story node's state may be changed (e.g., from active to sleeping) by an action of a node. Branching elements may have a single entry port and multiple exit ports. Branching elements may include conditional branching elements, random branching elements, and round-robin branching elements. All but one exit port of a conditional branching element may have a corresponding condition (e.g., a value of a property being equal to a predetermined value, a value of a property being equal to a value of another property). The conditional branching element may connect its entry port to the exit port whose condition is satisfied (e.g., via a conditional transition). If none of the conditions of the exit ports are satisfied, the branching element may connect its entry port to a default exit port that does not have a corresponding condition. A random branching element may connect its entry port to one of the multiple exit ports based on a random chance. In some embodiments, exit ports of the random branching element may include a weight property that increases or decreases the probability that those exit ports will be selected. A round-robin branching element may cycle through its exit ports each time the control flow passes through the element. For example, if a round-robin branching element has 3 exit ports, during the first pass, the entry port may be connected to the first exit port. On a second pass, the entry port may be connected to the second exit port. On a third pass, the entry port may be connected to the third exit port. On a fourth pass, the entry port may be connected to the first exit port again, and so forth.

Source elements and sink elements come in pairs. A transition may connect an exit port of a first story node to a sink element. A source element corresponding to the sink element may have a transition from the source element to an entry port of a second story node. When the control flow goes from the first story node through the node's exit port, the control flow will go through the sink, come out of the source, and go into the entry port of the second story node. Thus, the first story node and the second story node are connected via the sink and the source. A sink element may have one or more incoming transitions. A source element may have one outgoing transition.

The sidebar may include selectable action elements. Action elements may be connected to other control flow elements, story nodes, or actions via transitions. Actions may have a single entry port and a single exit port and may be configured to perform an action such as emitting a sound, starting an animation effect, changing a value of a node property, sending an HTTP request, logging one or more values, aborting sleeping nodes, waking-up sleeping nodes, or executing a code (e.g., Python code).

Any of the above discussed elements (story nodes, control flow elements, actions, etc.) can be grouped together by a DA creator. A group may include entry port elements that lead into the group and/or exit port elements that lead out of the group, but any entry/exit port elements in a group may add additional ports to the parent node. The entry port element(s) may be connected to an entry port of a story node, action, control flow element, etc. A group may also have its own properties that can be accessed by elements within the group or any parent node of the group. Any element within the group may behave as if it was included directly in the parent node. Mixin nodes may be predefined groups that allow a DA creator to easily add a set of behaviors and features to a story node. For example, a frequently asked questions (FAQ) mixin may exist that allows a DA creator to easily configure a DA to answer FAQs. The FAQ mixin may include one or more event handlers listening for speaking intents. Each event handler may be connected to a corresponding speaking node that answers the asked question.

A DA creator may also be able to group elements together within an empty story node (referred to as a "container node" herein) that has its own entry and exit ports. A container node may behave more like a story node and, as opposed to a group or mixin, would not behave as if the contents of the container node were included directly within the parent node.

The disclosed GUIs permit DA creators to drag and drop story nodes, flow control elements, and action elements from the sidebar into the main canvas area. When a story node is dropped in the main canvas area, the GUI expands the story node to show entry and/or exit ports. Each port on a story node can be connected to one or more story nodes, creating a graph in the main canvas area. For example, an exit port of one story node can be connected to the entry port of another story node. A story node may have one or more entry ports and one or more exit ports. For example, a single-choice story node may have one entry port, a default exit port, and an additional exit port for each choice that is configured within the single-choice story node.

When a DA creator selects an expanded story node in the main canvas area, the properties panel may become visible. An expanded story node may correspond to a story node from the sidebar and may show, in the main canvas area, additional properties associated with the story node. The properties panel may show one or more properties of the selected story node that can be configured by the DA creator. These properties may include, for example, questions that should be asked to the user, answer choices that should be presented to the user, and the amount of time the DA should wait for a response from the user. Some properties may be available to configure for all of the story nodes, whereas other properties may only be available for some of the story nodes. For example, all story nodes may have a property that configures how long the DA should wait for a response from the user, while a single-choice story node and a multiple-choice story node may have a property that configures what answer choices should be presented to a user.

When a DA creator selects a flow control element or an action element in the main canvas area, the properties panel may also become visible. The properties panel may show one or more properties of the selected flow control element or action element. Some properties may be read-only during configuration and during runtime, whereas others may be modifiable during configuration and read-only during runtime, whereas others still may be modifiable during both configuration and runtime.

The disclosed GUIs may include a generate configuration button to generate a configuration file that may include all of the story nodes, flow control elements, and/or actions from the main canvas area and their corresponding configurations as configured by a DA creator, including information relating to how each element is connected to one or more of the other elements. When loaded into a build engine, the generated configuration file may be used to configure various DA resources, including story nodes with associated MLMs, story nodes that are not associated with MLMs, libraries that may be shared by different story nodes, databases, and/or any other suitable resources. As a result, the build engine configures the DA to respond to user interactions based on the properties of each element in the graph. A deployment engine may then deploy the DA with the configured DA resources. To create a different DA interaction experience, a DA creator may create a different graph of elements in the main canvas area, may change the properties of one or more of the elements in the graph, and may interact with (e.g., click) the generate configuration button to generate a new configuration file. When the new configuration file is loaded into the same build engine, the DA may be configured to respond to user interactions based on the new properties of each element in the new graph. The new DA with the modified DA resources may then be deployed by the deployment engine.

Figure 6A:
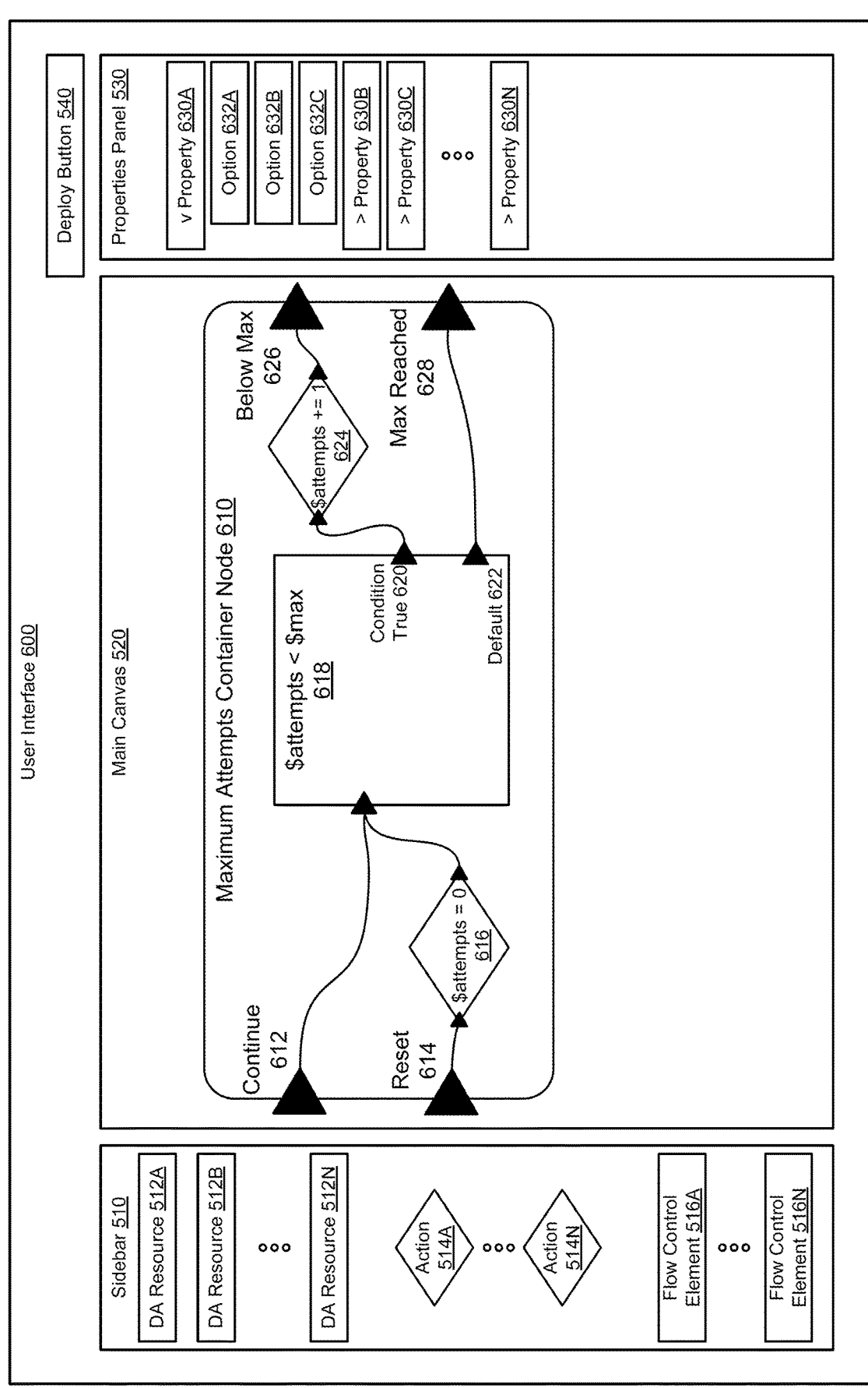
FIG. 6A illustrates an example user interface for configuring and deploying a digital avatar, according to at least one embodiment.

FIG. 6A illustrates an example user interface 600 for configuring and deploying a digital avatar, according to at least one embodiment. User interface 600 includes example elements (e.g., maximum attempts container node 610) in main canvas 520. Maximum attempts container node 610 may include one or more nested elements. For example, maximum attempts container node 610 may include continue entry port 612 and reset entry port 614. Continue entry port 612 may include a transition to conditional branching element 618. Reset entry port 614 may include a transition to action 616, which may be configured to set to zero the value of an $attempts property of maximum attempts container node 610. After modifying the value of the $attempts property, action 616 may transition to conditional branching element 618. Conditional branching element 618 may compare a value of the $attempts property to the value of a $max property. Conditional branching element 618 may be configured to transition via condition true exit port 620 if, during runtime, the value of $attempts property is less than the value of $max property. Alternatively, if the value of $attempts property is greater than or equal to the value of $max property during runtime, conditional branching element 618 may transition via default exit port 622. Condition true exit port 620 may transition to action 624, which may increment the value of $attempts property (e.g., by 1) before transitioning to below max exit port 626. Default exit port 622 may transition to max reached exit port 628. Continue entry port 612, reset entry port 614, below max exit port 626, and max reached exit port 628 may be connected via transitions to other story nodes or elements (not shown) in main canvas 520.

Properties panel 530 may display properties 630A-N. In some embodiments, properties 630A-N may include a collapsible menu. For example, when expanded, property 630A may reveal options 632A-C. Property 630A may correspond to a property of maximum attempts container node 610. For example, property 630A may correspond to $attempts property or $max property. Some properties may be configured at configuration time and read-only during runtime. For example, $max property may be set to 3 during configuration and may not be modified during runtime. Alternatively, $attempts property may be set to 0 during configuration and may be modified during runtime (e.g., by action 616 or action 624).

Figure 6B:
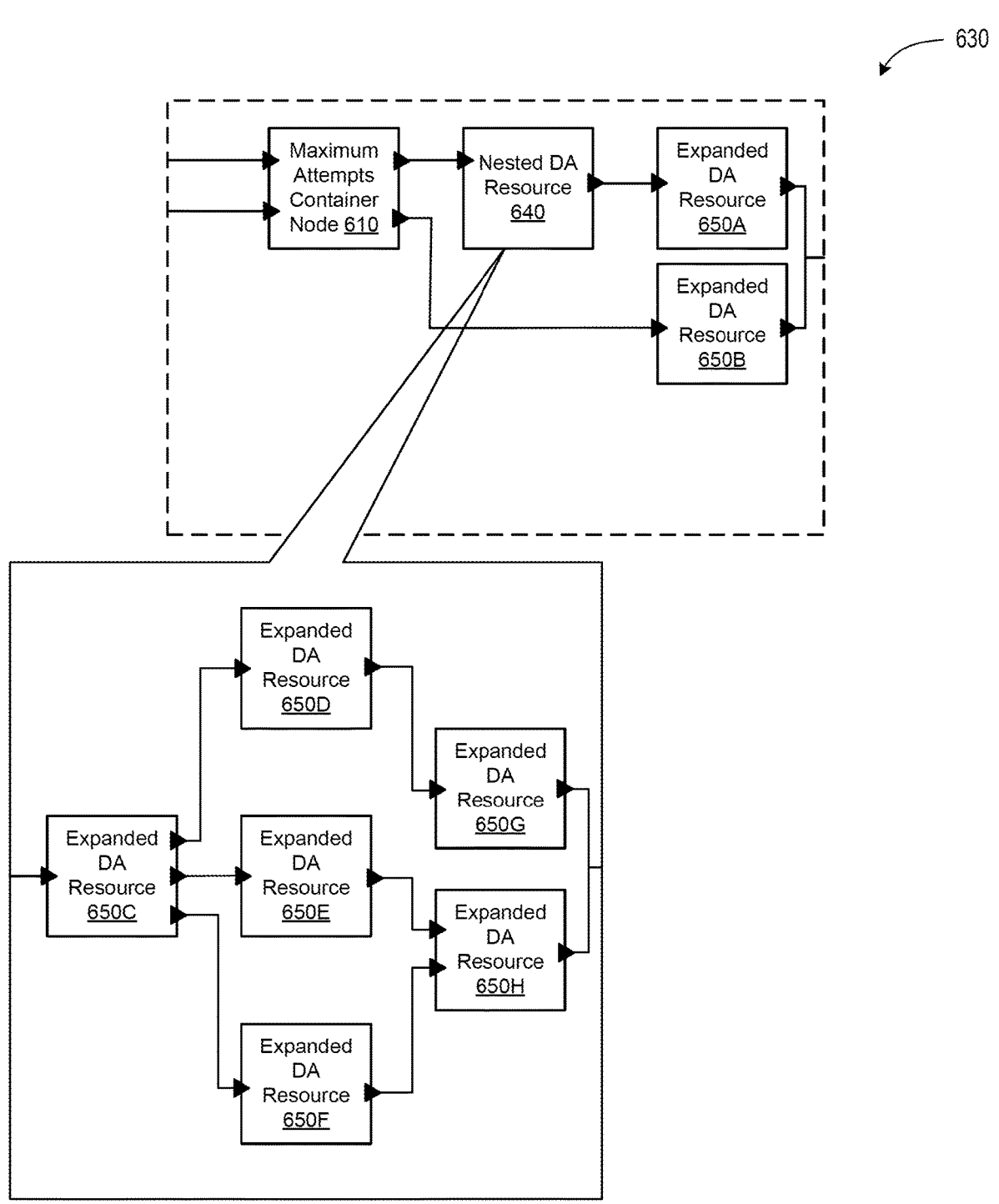
FIG. 6B illustrates example digital avatar resources for configuring a digital avatar, according to at least one embodiment.

FIG. 6B illustrates example digital avatar resources 630 for configuring a digital avatar, according to at least one embodiment. Digital avatar resources 630 may be included in main canvas 520 of FIG. 6A. Nested DA resource 640 may be connected to maximum attempts container node 610 and may include expanded DA resources 650C-H. Expanded DA resources 650C-H may be connected via transitions in a graph, as shown. Nested DA resource 640 may be connected via a transition to expanded DA resource 650A. Maximum attempts container node 610 may also be connected to expanded DA resource 650B. By connecting various multi-modal DA resources via transitions, a graph can be created that defines a multi-modal DA execution flow of a DA-user interaction episode. Multi-modal DA interaction episodes may be directed to specific DA-customer interactive tasks. DA-customer interactive tasks may include, but are not limited to, a customer identification, a customer greeting, a barcode scanning operation, a financial operation, a single-question conversation, a multiple-question conversation, a user engagement (e.g., a first bump, telling a joke, etc.), making a purchase, paying a bill, answering FAQs, making a reservation, and/or a DA-animated interaction. Individual multi-modal DA resources (e.g., multi-modal DA interaction resources) may be directed to and may program stages of an interaction episode.

Figure 7:
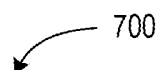
FIG. 7 illustrates an example dialog of a user interface for configuring and deploying a digital avatar, according to at least one embodiment.

FIG. 7 illustrates an example dialog 700 of a user interface for configuring and deploying a digital avatar, according to at least one embodiment. A DA creator may include a questionnaire story node (e.g., single-choice story node, multiple-choice story node, multiple-question story node, etc.) in a graph of multi-modal DA resources. The questionnaire story node may be configured to display questionnaire dialog 710 to a user. Questionnaire dialog 710 may include one or more questions 720A-C. Individual questions 720A-C may include one or more answer choices (e.g., answer choice 730A-D). A single-choice story node may include a single question with one or more answer choices and may allow a user to select one answer. A multiple-choice story node may include a single question with one or more answer choices and may allow a user to select one or more answers. A multiple-question story node may include one or more questions, each with one or more answer choices, and may allow a user to select one or more answers for each question. During configuration, a DA creator may be presented with questionnaire dialog 710 to preview how it will appear to a user. A DA creator may configure each question and/or answer using properties (e.g., in properties panel 530 of FIG. 5) of the associated story node. Questionnaire dialog 710 may include cancel button 740 and submit button 750. Responsive to an interaction by a user, cancel button 740 may emit a "questionnaire cancelled" event. The corresponding story node may include an event handler configured to respond to a "questionnaire cancelled" event and may perform an action or transition to another element (e.g., story node, flow control element, etc.) in response to receiving the event. Similarly, responsive to an interaction by a user, submit button 750 may emit a "questionnaire submitted" event. The corresponding story node may include an event handler configured to respond to a "questionnaire submitted" event. The "questionnaire submitted" event may include data indicating the one or more answers the user selected in the questionnaire. The event handler may perform an action or transition to another element based on the data included in the event.

FIGS. 8-11 are flow diagrams of example methods 800, 900, 1000, and 1100 of configuring and deploying digital avatar resources, according to at least one embodiment. These methods may be performed using one or more processing units (e.g., CPUs, GPUs, accelerators, PPUs, DPUs, etc.), which may include (or communicate with) one or more memory devices. In at least one embodiment, methods 800, 900, 1000, and 1100 may be performed by build engine 410, deployment engine 420, and/or DA host 430 of FIG. 4. In at least one embodiment, processing units performing any of methods 800, 900, 1000, and 1100 may be executing instructions stored on a non-transient computer-readable storage media. In at least one embodiment, any of methods 800, 900, 1000, and 1100 may be performed using multiple processor threads (e.g., CPU threads and/or GPU threads), individual threads executing one or more individual functions, routines, subroutines, or operations of the method. In at least one embodiment, processing threads implementing any of methods 800, 900, 1000, and 1100 may be synchronized (e.g., using semaphores, critical sections, and/or other thread synchronization mechanisms). Alternatively, processing threads implementing any of methods 800, 900, 1000, and 1100 may be executed asynchronously with respect to each other. Various operations of any of methods 800, 900, 1000, and 1100 may be performed in a different order compared with the order shown in FIGS. 8-11. Some operations of any of methods 800, 900, 1000, and 1100 may be performed concurrently with other operations. In at least one embodiment, one or more operations shown in FIGS. 8-11 may not always be performed.

Figure 8:
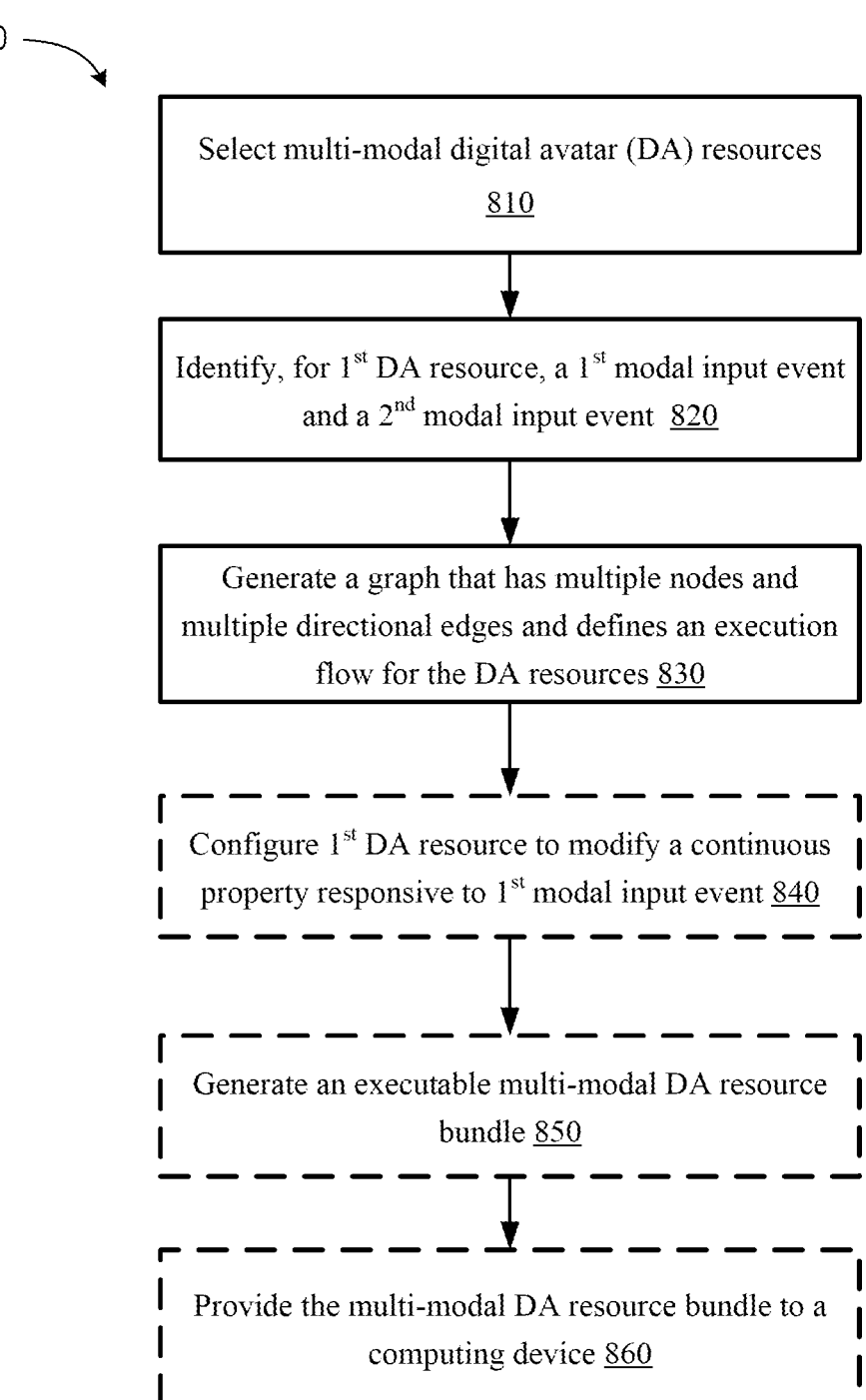
FIG. 8 is a flow diagram of an example method of configuring and deploying a digital avatar resource, according to at least one embodiment.

FIG. 8 is a flow diagram of an example method 800 of configuring and deploying a digital avatar resource, according to at least one embodiment. At block 810, one or more processing devices may select multi-modal DA resources. At block 820, the one or more processing devices may identify, for a first DA resource, a first modal input event and a second modal input event. At block 830, the one or more processing devices may generate a graph that has multiple nodes and multiple directional edges and defines an execution flow for the DA resources. Individual directional edges of the graph may be associated with conditional transitions of the multi-modal DA execution flow between two nodes of the plurality of nodes. At block 840, in some embodiments, the one or more processing devices may configure a first DA resource to modify a continuous property responsive to receiving the first modal input event. At block 850, in some embodiments, the one or more processing devices may generate an executable multi-modal DA resource bundle. At block 860, in some embodiments, the one or more processing devices may provide the multi-modal DA resource bundle to a computing device.

FIG. 9 is a flow diagram of an example method 900 of configuring a new digital avatar resource for deployment in a digital avatar, according to at least one embodiment. At block 910, one or more processing devices may receive a configuration for a multi-modal DA resource. At block 920, the one or more processing devices may configure actions associated with the multi-modal DA resource. At block 930, the one or more processing devices may configure exit port(s) associated with the multi-modal DA resource. At block 940, the one or more processing devices may configure event handler(s) associated with the multi-modal DA resource to receive modal input event(s). At block 950, the one or more processing devices may configure the event handler(s) to select, responsive to a received modal input event, an action and/or an exit port.

FIG. 10 is a flow diagram of an example method 1000 of configuring and deploying a digital avatar, according to at least one embodiment. In some embodiments, at block 1010, one or more processing devices may receive, via a UI, an initial user input indicative of a selected DA template associated with a type of the DA to be deployed. For example, a DA creator may be able to select from a repository of DA templates that includes a restaurant-ordering template, a hotel-reservation template, a kiosk template, an online-chatbot template, or the like. At block 1020, the one or more processing devices may access a plurality of DA resources, wherein each DA resource is associated with initial configuration settings. For example, individual DA resources may have default values associated with one or more of their associated properties. DA resources in a selected DA template may have initial parameter values that are different than the default parameter values. At block 1030, the one or more processing devices may provide a UI to receive a user input indicative of a selection of one or more of the plurality of DA resources and a modification to the initial configuration settings of the one or more DA resources. During configuration, a DA creator may modify one or more properties of the one or more DA resources. A DA creator may also modify one or more transitions between one or more DA resources and other DA elements (e.g., actions, flow control elements, or the like). At block 1040, the one or more processing devices may determine modified configuration settings for the one or more selected DA resources based on the user input. In some embodiments, all properties of the selected DA resources may be determined. In some embodiments, only properties with values different than the default values may be determined. At block 1050, the one or more processing devices may cause execution of a build engine to modify the one or more selected DA resources in accordance with the modified configuration settings. At block 1060, the one or more processing devices may cause execution of a deployment engine to deploy the DA with the one or more modified DA resources. The deployment engine may deploy the DA to a DA host. In some embodiments, the deployment engine may modify a DA that is currently executing on a DA host. At block 1070, the one or more processing devices may cause display, on the UI, of a representation of the deployed DA.

FIG. 11 is a flow diagram of an example method 1100 of generating a new digital avatar resource for deployment in a digital avatar, according to at least one embodiment. At block 1110, one or more processing devices may provide, via a UI, a list of available trained MLMs, wherein each of the MLMs is associated with a respective DA-customer interaction task. For example, a trained speech-to-text model may be associated with a question interaction task. A trained text-to-speech model may be associated with a speech interaction task. A trained presence detection model may be associated with an attract-user interaction task. In some embodiments, a trained MLM may be associated with more than on DA-customer interaction task. In some embodiments, a DA-customer interaction task may require more than one trained MLM. In some embodiments, a DA creator may be presented with a questionnaire to help the DA creator select a template. The questionnaire may ask questions to help determine which MLMs will be most useful for the DA-customer (e.g., DA-user) interaction task. At block 1120, the one or more processing devices may receive, with the user input, a selection of one or more MLMs from the list of MLMs. At block 1130, the one or more processing devices may cause execution of the build engine to generate a new DA resource comprising the received selection of the one or more MLMs. In some embodiments, a DA template may be selected based on the selected one or more MLMs. In some embodiments, the new DA resource may correspond to a new story node. At block 1140, the one or more processing devices may cause execution of the deployment engine to include the new DA resource into the deployed DA.

Inference and Training Logic

Figure 12A:
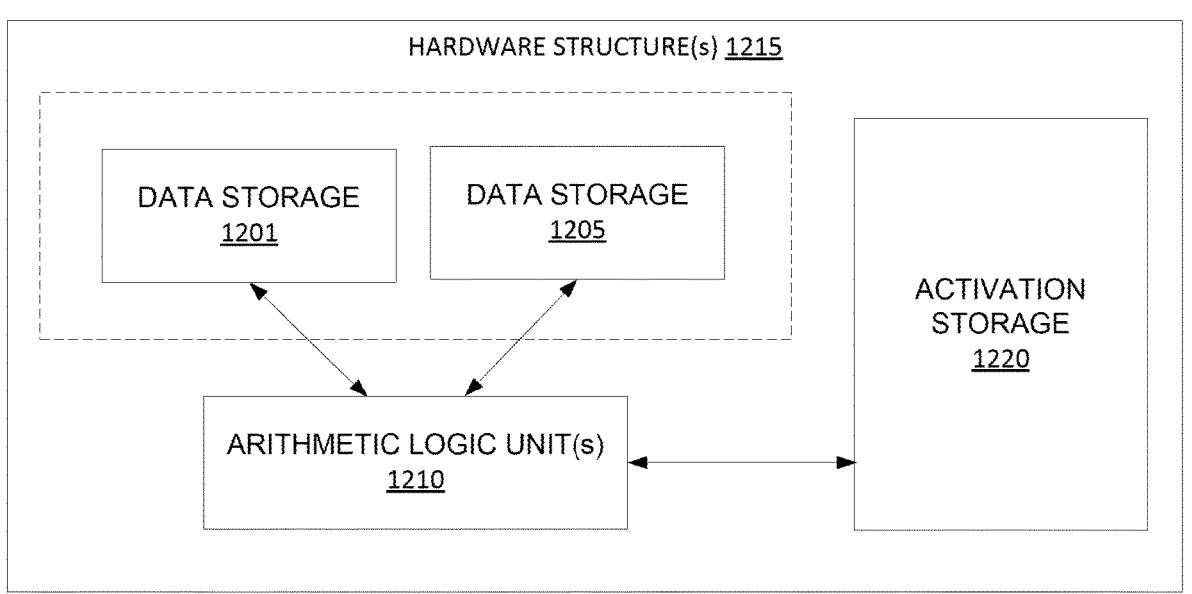
FIG. 12A illustrates inference and/or training logic, according to at least one embodiment.

FIG. 12A illustrates inference and/or training logic 1215 used to perform inferencing and/or training operations associated with one or more embodiments. Details regarding inference and/or training logic 1215 are provided below in conjunction with FIGS. 12A and/or 12B.

In at least one embodiment, inference and/or training logic 1215 may include, without limitation, code and/or data storage 1201 to store forward and/or output weight and/or input/output data, and/or other parameters to configure neurons or layers of a neural network trained and/or used for inferencing in aspects of one or more embodiments. In at least one embodiment, training logic 1215 may include, or be coupled to code and/or data storage 1201 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1201 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1201 may be included with other on-chip or off-chip data storage, including a processor's L1, L2, or L3 cache or system memory.

In at least one embodiment, any portion of code and/or data storage 1201 may be internal or external to one or more processors or other hardware logic devices or circuits. In at least one embodiment, code and/or data storage 1201 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 1201 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1215 may include, without limitation, a code and/or data storage 1205 to store backward and/or output weight and/or input/output data corresponding to neurons or layers of a neural network trained and/or used for inferencing in aspects of one or more embodiments. In at least one embodiment, code and/or data storage 1205 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1215 may include, or be coupled to code and/or data storage 1205 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1205 may be included with other on-chip or off-chip data storage, including a processor's L1, L2, or L3 cache or system memory. In at least one embodiment, any portion of code and/or data storage 1205 may be internal or external to on one or more processors or other hardware logic devices or circuits. In at least one embodiment, code and/or data storage 1205 may be cache memory, DRAM, SRAM, non-volatile memory (e.g., Flash memory), or other storage. In at least one embodiment, choice of whether code and/or data storage 1205 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1201 and code and/or data storage 1205 may be separate storage structures. In at least one embodiment, code and/or data storage 1201 and code and/or data storage 1205 may be same storage structure. In at least one embodiment, code and/or data storage 1201 and code and/or data storage 1205 may be partially same storage structure and partially separate storage structures. In at least one embodiment, any portion of code and/or data storage 1201 and code and/or data storage 1205 may be included with other on-chip or off-chip data storage, including a processor's L1, L2, or L3 cache or system memory.

In at least one embodiment, inference and/or training logic 1215 may include, without limitation, one or more arithmetic logic unit(s) ("ALU(s)") 1210, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1220 that are functions of input/output and/or weight parameter data stored in code and/or data storage 1201 and/or code and/or data storage 1205. In at least one embodiment, activations stored in activation storage 1220 are generated according to linear algebraic and or matrix-based mathematics performed by ALU(s) 1210 in response to performing instructions or other code, wherein weight values stored in code and/or data storage 1205 and/or code and/or data storage 1201 are used as operands along with other values, such as bias values, gradient information, momentum values, or other parameters or hyperparameters, any or all of which may be stored in code and/or data storage 1205 or code and/or data storage 1201 or another storage on or off-chip.

In at least one embodiment, ALU(s) 1210 are included within one or more processors or other hardware logic devices or circuits, whereas in another embodiment, ALU(s) 1210 may be external to a processor or other hardware logic device or circuit that uses them (e.g., a co-processor). In at least one embodiment, ALUs 1210 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1201, code and/or data storage 1205, and activation storage 1220 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1220 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1220 may be cache memory, DRAM, SRAM, non-volatile memory (e.g., Flash memory), or other storage. In at least one embodiment, activation storage 1220 may be completely or partially within or external to one or more processors or other logical circuits. In at least one embodiment, choice of whether activation storage 1220 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1215 illustrated in FIG. 12A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1215 illustrated in FIG. 12A may be used in conjunction with central processing unit ("CPU") hardware, graphics processing unit ("GPU") hardware or other hardware, such as data processing unit ("DPU") hardware, or field programmable gate arrays ("FPGAs").

Figure 12B:
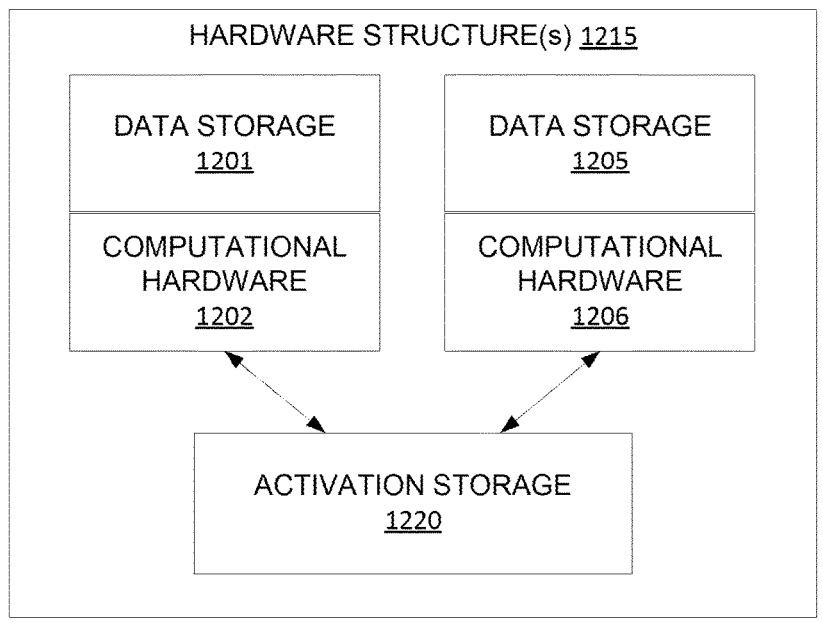
FIG. 12B illustrates inference and/or training logic, according to at least one embodiment.

FIG. 12B illustrates inference and/or training logic 1215, according to at least one or more embodiments. In at least one embodiment, inference and/or training logic 1215 may include, without limitation, hardware logic in which computational resources are dedicated or otherwise exclusively used in conjunction with weight values or other information corresponding to one or more layers of neurons within a neural network. In at least one embodiment, inference and/or training logic 1215 illustrated in FIG. 12B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1215 illustrated in FIG. 12B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 1215 includes, without limitation, code and/or data storage 1201 and code and/or data storage 1205, which may be used to store code (e.g., graph code), weight values and/or other information, including bias values, gradient information, momentum values, and/or other parameter or hyperparameter information. In at least one embodiment illustrated in FIG. 12B, each of code and/or data storage 1201 and code and/or data storage 1205 is associated with a dedicated computational resource, such as computational hardware 1202 and computational hardware 1206, respectively. In at least one embodiment, each of computational hardware 1202 and computational hardware 1206 comprises one or more ALUs that perform mathematical functions, such as linear algebraic functions, only on information stored in code and/or data storage 1201 and code and/or data storage 1205, respectively, result of which is stored in activation storage 1220.

In at least one embodiment, each of code and/or data storage 1201 and 1205 and corresponding computational hardware 1202 and 1206, respectively, correspond to different layers of a neural network, such that resulting activation from one "storage/computational pair 1201/1202" of code and/or data storage 1201 and computational hardware 1202 is provided as an input to "storage/computational pair 1205/1206" of code and/or data storage 1205 and computational hardware 1206, in order to mirror conceptual organization of a neural network. In at least one embodiment, each of storage/computational pairs 1201/1202 and 1205/1206 may correspond to more than one neural network layer. In at least one embodiment, additional storage/computation pairs (not shown) subsequent to or in parallel with storage computation pairs 1201/1202 and 1205/1206 may be included in inference and/or training logic 1215.

Data Center

FIG. 13 illustrates an example data center 1300, in which at least one embodiment may be used. In at least one embodiment, data center 1300 includes a data center infrastructure layer 1310, a framework layer 1320, a software layer 1330, and an application layer 1340.

In at least one embodiment, as shown in FIG. 13, data center infrastructure layer 1310 may include a resource orchestrator 1312, grouped computing resources 1314, and node computing resources ("node C.R.s") 1316 (1)-1316 (N), where "N" represents any whole, positive integer. In at least one embodiment, node C.R.s 1316 (1)-1316 (N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1316 (1)-1316 (N) may be a server having one or more of above-mentioned computing resources.

In at least one embodiment, grouped computing resources 1314 may include separate groupings of node C.R.s housed within one or more racks (not shown), or many racks housed in data centers at various geographical locations (also not shown). Separate groupings of node C.R.s within grouped computing resources 1314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1312 may configure or otherwise control one or more node C.R.s 1316 (1)-1316 (N) and/or grouped computing resources 1314. In at least one embodiment, resource orchestrator 1312 may include a software design infrastructure ("SDI") management entity for data center 1300. In at least one embodiment, resource orchestrator may include hardware, software or some combination thereof.

In at least one embodiment, as shown in FIG. 13, framework layer 1320 includes a job scheduler 1322, a configuration manager 1324, a resource manager 1326 and a distributed file system 1328. In at least one embodiment, framework layer 1320 may include a framework to support software 1332 of software layer 1330 and/or one or more application(s) 1342 of application layer 1340. In at least one embodiment, software 1332 or application(s) 1342 may respectively include web-based service software or applications, such as those provided by Amazon Web Services, Google Cloud and Microsoft Azure. In at least one embodiment, framework layer 1320 may be, but is not limited to, a type of free and open-source software web application framework such as Apache Spark™ (hereinafter "Spark") that may utilize distributed file system 1328 for large-scale data processing (e.g., "big data"). In at least one embodiment, job scheduler 1322 may include a Spark driver to facilitate scheduling of workloads supported by various layers of data center 1300. In at least one embodiment, configuration manager 1324 may be capable of configuring different layers such as software layer 1330 and framework layer 1320 including Spark and distributed file system 1328 for supporting large-scale data processing. In at least one embodiment, resource manager 1326 may be capable of managing clustered or grouped computing resources mapped to or allocated for support of distributed file system 1328 and job scheduler 1322. In at least one embodiment, clustered or grouped computing resources may include grouped computing resource 1314 at data center infrastructure layer 1310. In at least one embodiment, resource manager 1326 may coordinate with resource orchestrator 1312 to manage these mapped or allocated computing resources.

In at least one embodiment, software 1332 included in software layer 1330 may include software used by at least portions of node C.R.s 1316 (1)-1316 (N), grouped computing resources 1314, and/or distributed file system 1328 of framework layer 1320. The one or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316 (N), grouped computing resources 1314, and/or distributed file system 1328 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1324, resource manager 1326, and resource orchestrator 1312 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor performing portions of a data center.

In at least one embodiment, data center 1300 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1300. In at least one embodiment, trained machine learning models corresponding to one or more neural networks may be used to infer or predict information using resources described above with respect to data center 1300 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1215 are used to perform inferencing and/or training operations associated with one or more embodiments. Details regarding inference and/or training logic 1215 are provided below in conjunction with FIGS. 12A and/or 12B. In at least one embodiment, inference and/or training logic 1215 may be used in system FIG. 13 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 14:
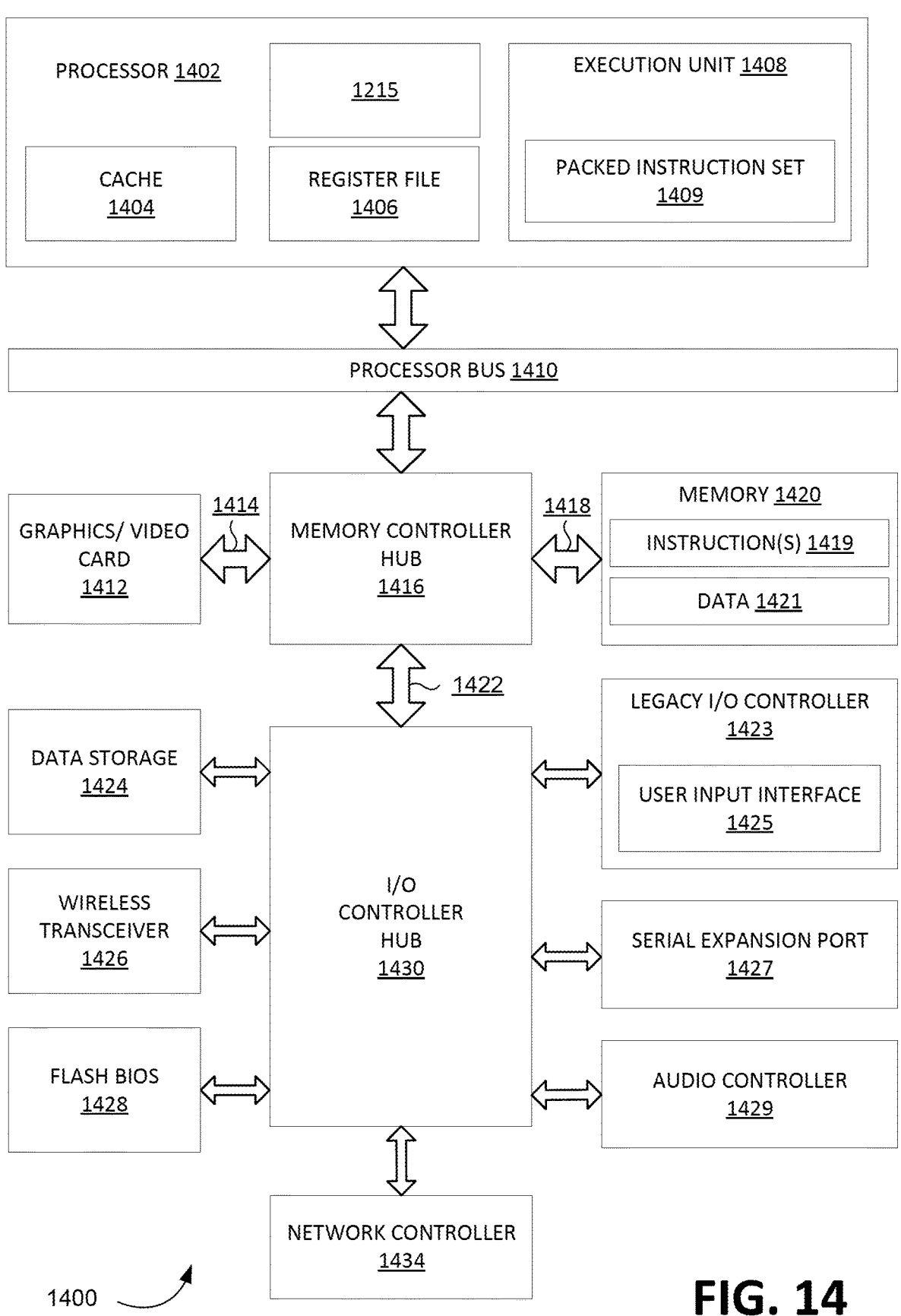
FIG. 14 illustrates a computer system, according to at least one embodiment.

FIG. 14 is a block diagram illustrating an exemplary computer system, which may be a system with interconnected devices and components, a system-on-a-chip (SOC) or some combination thereof 1400 formed with a processor that may include execution units to execute an instruction, according to at least one embodiment. In at least one embodiment, computer system 1400 may include, without limitation, a component, such as a processor 1402 to employ execution units including logic to perform algorithms for process data, in accordance with present disclosure, such as in embodiment described herein. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1400 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 1400 may include, without limitation, processor 1402 that may include, without limitation, one or more execution units 1408 to perform machine learning model training and/or inferencing according to techniques described herein. In at least one embodiment, computer system 1400 is a single processor desktop or server system, but in another embodiment computer system 1400 may be a multiprocessor system. In at least one embodiment, processor 1402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1402 may be coupled to a processor bus 1410 that may transmit data signals between processor 1402 and other components in computer system 1400.

In at least one embodiment, processor 1402 may include, without limitation, a Level 1 ("L1") internal cache memory ("cache") 1404. In at least one embodiment, processor 1402 may have a single internal cache or multiple levels of internal cache. In at least one embodiment, cache memory may reside external to processor 1402. Other embodiments may also include a combination of both internal and external caches depending on particular implementation and needs. In at least one embodiment, register file 1406 may store different types of data in various registers including, without limitation, integer registers, floating point registers, status registers, and instruction pointer register.

In at least one embodiment, execution unit 1408, including, without limitation, logic to perform integer and floating point operations, also resides in processor 1402. In at least one embodiment, processor 1402 may also include a microcode ("ucode") read only memory ("ROM") that stores microcode for certain macro instructions. In at least one embodiment, execution unit 1408 may include logic to handle a packed instruction set 1409. In at least one embodiment, by including packed instruction set 1409 in an instruction set of a general-purpose processor 1402, along with associated circuitry to execute instructions, operations used by many multimedia applications may be performed using packed data in a general-purpose processor 1402. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1408 may also be used in microcontrollers, embedded processors, graphics devices, DSPs, and other types of logic circuits. In at least one embodiment, computer system 1400 may include, without limitation, a memory 1420. In at least one embodiment, memory 1420 may be implemented as a Dynamic Random Access Memory ("DRAM") device, a Static Random Access Memory ("SRAM") device, flash memory device, or other memory device. In at least one embodiment, memory 1420 may store instruction(s) 1419 and/or data 1421 represented by data signals that may be executed by processor 1402.

In at least one embodiment, system logic chip may be coupled to processor bus 1410 and memory 1420. In at least one embodiment, system logic chip may include, without limitation, a memory controller hub ("MCH") 1416, and processor 1402 may communicate with MCH 1416 via processor bus 1410. In at least one embodiment, MCH 1416 may provide a high bandwidth memory path 1418 to memory 1420 for instruction and data storage and for storage of graphics commands, data and textures. In at least one embodiment, MCH 1416 may direct data signals between processor 1402, memory 1420, and other components in computer system 1400 and to bridge data signals between processor bus 1410, memory 1420, and a system I/O 1422. In at least one embodiment, system logic chip may provide a graphics port for coupling to a graphics controller. In at least one embodiment, MCH 1416 may be coupled to memory 1420 through a high bandwidth memory path 1418 and graphics/video card 1412 may be coupled to MCH 1416 through an Accelerated Graphics Port ("AGP") interconnect 1414.

In at least one embodiment, computer system 1400 may use system I/O 1422 that is a proprietary hub interface bus to couple MCH 1416 to I/O controller hub ("ICH") 1430. In at least one embodiment, ICH 1430 may provide direct connections to some I/O devices via a local I/O bus. In at least one embodiment, local I/O bus may include, without limitation, a high-speed I/O bus for connecting peripherals to memory 1420, chipset, and processor 1402. Examples may include, without limitation, an audio controller 1429, a firmware hub ("flash BIOS") 1428, a wireless transceiver 1426, a data storage 1424, a legacy I/O controller 1423 containing user input and keyboard interfaces 1425, a serial expansion port 1427, such as Universal Serial Bus ("USB"), and a network controller 1434, which may include in some embodiments, a data processing unit. Data storage 1424 may comprise a hard disk drive, a floppy disk drive, a CD-ROM device, a flash memory device, or other mass storage device.

In at least one embodiment, FIG. 14 illustrates a system, which includes interconnected hardware devices or "chips", whereas in other embodiments, FIG. 14 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1400 are interconnected using compute express link (CXL) interconnects.

Inference and/or training logic 1215 are used to perform inferencing and/or training operations associated with one or more embodiments. Details regarding inference and/or training logic 1215 are provided below in conjunction with FIGS. 12A and/or 12B. In at least one embodiment, inference and/or training logic 1215 may be used in system FIG. 14 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 15:
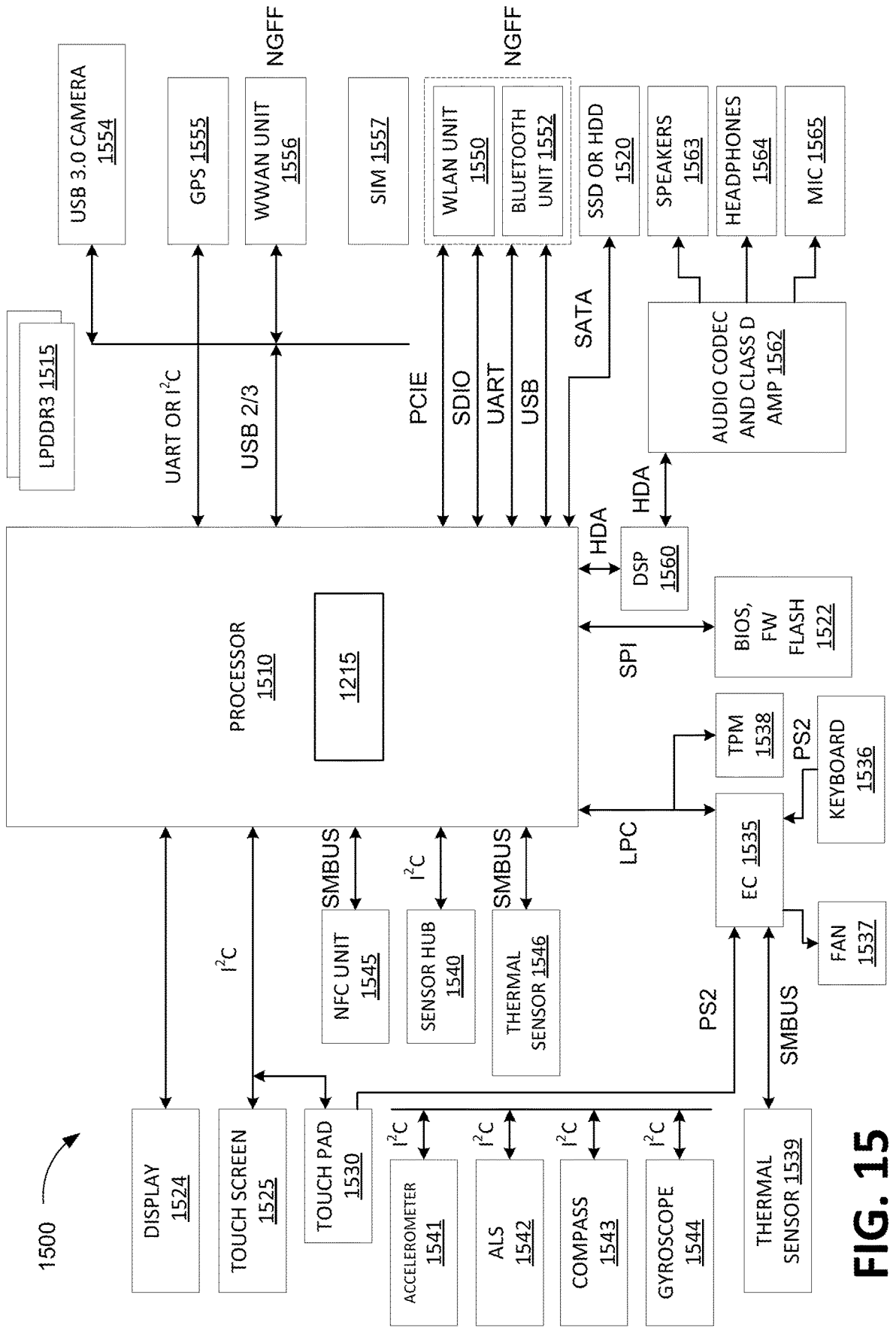
FIG. 15 illustrates a computer system, according to at least one embodiment.

FIG. 15 is a block diagram illustrating an electronic device 1500 for utilizing a processor 1510, according to at least one embodiment. In at least one embodiment, electronic device 1500 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, electronic device 1500 may include, without limitation, processor 1510 communicatively coupled to any suitable number or kind of components, peripherals, modules, or devices. In at least one embodiment, processor 1510 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 15 illustrates a system, which includes interconnected hardware devices or "chips", whereas in other embodiments, FIG. 15 may illustrate an exemplary System on a Chip ("SoC"). In at least one embodiment, devices illustrated in FIG. 15 may be interconnected with proprietary interconnects, standardized interconnects (e.g., PCIe) or some combination thereof. In at least one embodiment, one or more components of FIG. 15 are interconnected using compute express link (CXL) interconnects.

In at least one embodiment, FIG. 11 may include a display 1524, a touch screen 1525, a touch pad 1530, a Near Field Communications unit ("NFC") 1545, a sensor hub 1540, a thermal sensor 1546, an Express Chipset ("EC") 1535, a Trusted Platform Module ("TPM") 1538, BIOS/firmware/flash memory ("BIOS, FW Flash") 1522, a DSP 1560, a drive 1520 such as a Solid State Disk ("SSD") or a Hard Disk Drive ("HDD"), a wireless local area network unit ("WLAN") 1550, a Bluetooth unit 1552, a Wireless Wide Area Network unit ("WWAN") 1556, a Global Positioning System (GPS) 1555, a camera ("USB 3.0 camera") 1554 such as a USB 3.0 camera, and/or a Low Power Double Data Rate ("LPDDR") memory unit ("LPDDR3") 1515 implemented in, for example, LPDDR3 standard. These components may each be implemented in any suitable manner.

In at least one embodiment, other components may be communicatively coupled to processor 1510 through components discussed above. In at least one embodiment, an accelerometer 1541, Ambient Light Sensor ("ALS") 1542, compass 1543, and a gyroscope 1544 may be communicatively coupled to sensor hub 1540. In at least one embodiment, thermal sensor 1539, a fan 1537, a keyboard 1536, and a touch pad 1530 may be communicatively coupled to EC 1535. In at least one embodiment, speaker 1563, headphones 1564, and microphone ("mic") 1565 may be communicatively coupled to an audio unit ("audio codec and class d amp") 1562, which may in turn be communicatively coupled to DSP 1560. In at least one embodiment, audio unit 1562 may include, for example and without limitation, an audio coder/decoder ("codec") and a class D amplifier. In at least one embodiment, SIM card ("SIM") 1557 may be communicatively coupled to WWAN unit 1556. In at least one embodiment, components such as WLAN unit 1550 and Bluetooth unit 1552, as well as WWAN unit 1556 may be implemented in a Next Generation Form Factor ("NGFF").

Inference and/or training logic 1215 are used to perform inferencing and/or training operations associated with one or more embodiments. Details regarding inference and/or training logic 1215 are provided below in conjunction with FIGS. 12A and/or 12B. In at least one embodiment, inference and/or training logic 1215 may be used in system FIG. 15 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 16:
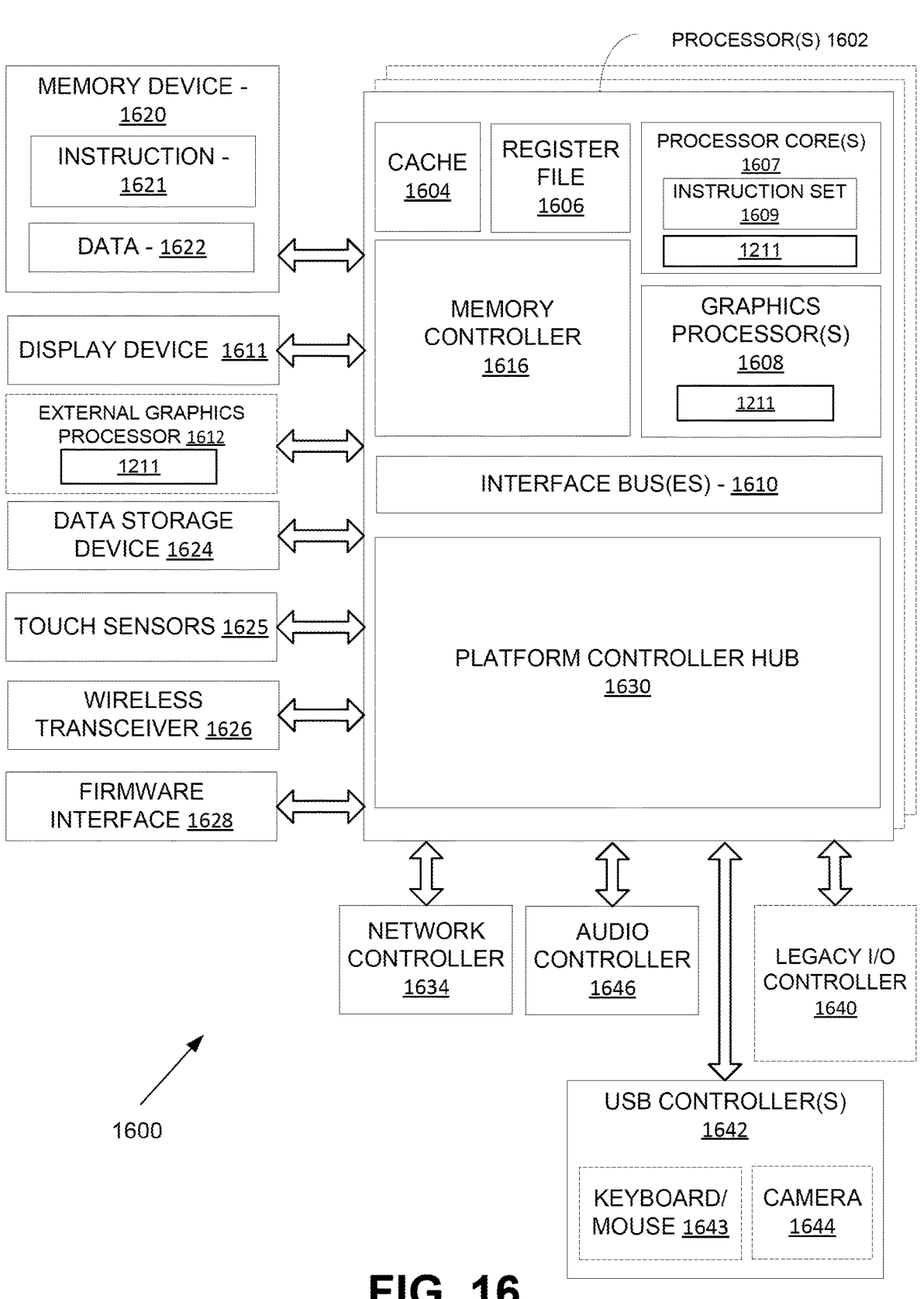
FIG. 16 illustrates at least portions of a graphics processor, according to one or more embodiments.

FIG. 16 is a block diagram of a processing system, according to at least one embodiment. In at least one embodiment, system 1600 includes one or more processors 1602 and one or more graphics processors 1608, and may be a single processor desktop system, a multiprocessor workstation system, or a server system having a large number of processors 1602 or processor cores 1607. In at least one embodiment, system 1600 is a processing platform incorporated within a system-on-a-chip (SoC) integrated circuit for use in mobile, handheld, edge, or embedded devices.

In at least one embodiment, system 1600 may include, or be incorporated within a server-based gaming platform, a game console, including a game and media console, a mobile gaming console, a handheld game console, or an online game console. In at least one embodiment, system 1600 is a mobile phone, smart phone, tablet computing device or mobile Internet device. In at least one embodiment, processing system 1600 may also include, couple with, or be integrated within a wearable device, such as a smart watch wearable device, smart eyewear device, augmented reality device, or virtual reality device. In at least one embodiment, processing system 1600 is a television or set top box device having one or more processors 1602 and a graphical interface generated by one or more graphics processors 1608.

In at least one embodiment, one or more processors 1602 each include one or more processor cores 1607 to process instructions which, when executed, perform operations for system and user software. In at least one embodiment, each of one or more processor cores 1607 is configured to process a specific instruction set 1609. In at least one embodiment, instruction set 1609 may facilitate Complex Instruction Set Computing (CISC), Reduced Instruction Set Computing (RISC), or computing via a Very Long Instruction Word (VLIW). In at least one embodiment, processor cores 1607 may each process a different instruction set 1609, which may include instructions to facilitate emulation of other instruction sets. In at least one embodiment, processor core 1607 may also include other processing devices, such a Digital Signal Processor (DSP).

In at least one embodiment, processor 1602 includes cache memory 1604. In at least one embodiment, processor 1602 may have a single internal cache or multiple levels of internal cache. In at least one embodiment, cache memory is shared among various components of processor 1602. In at least one embodiment, processor 1602 also uses an external cache (e.g., a Level-3 (L3) cache or Last Level Cache (LLC)) (not shown), which may be shared among processor cores 1607 using known cache coherency techniques. In at least one embodiment, register file 1606 is additionally included in processor 1602 which may include different types of registers for storing different types of data (e.g., integer registers, floating point registers, status registers, and an instruction pointer register). In at least one embodiment, register file 1606 may include general-purpose registers or other registers.

In at least one embodiment, one or more processor(s) 1602 are coupled with one or more interface bus(es) 1610 to transmit communication signals such as address, data, or control signals between processor 1602 and other components in system 1600. In at least one embodiment, interface bus 1610, in one embodiment, may be a processor bus, such as a version of a Direct Media Interface (DMI) bus. In at least one embodiment, interface 1610 is not limited to a DMI bus, and may include one or more Peripheral Component Interconnect buses (e.g., PCI, PCI Express), memory busses, or other types of interface busses. In at least one embodiment processor(s) 1602 include an integrated memory controller 1616 and a platform controller hub 1630. In at least one embodiment, memory controller 1616 facilitates communication between a memory device and other components of system 1600, while platform controller hub (PCH) 1630 provides connections to I/O devices via a local I/O bus.

In at least one embodiment, memory device 1620 may be a dynamic random access memory (DRAM) device, a static random access memory (SRAM) device, flash memory device, phase-change memory device, or some other memory device having suitable performance to serve as process memory. In at least one embodiment memory device 1620 may operate as system memory for system 1600, to store data 1622 and instructions 1621 for use when one or more processors 1602 executes an application or process. In at least one embodiment, memory controller 1616 also couples with an optional external graphics processor 1612, which may communicate with one or more graphics processors 1608 in processors 1602 to perform graphics and media operations. In at least one embodiment, a display device 1611 may connect to processor(s) 1602. In at least one embodiment display device 1611 may include one or more of an internal display device, as in a mobile electronic device or a laptop device or an external display device attached via a display interface (e.g., DisplayPort, etc.). In at least one embodiment, display device 1611 may include a head mounted display (HMD) such as a stereoscopic display device for use in virtual reality (VR) applications or augmented reality (AR) applications.

In at least one embodiment, platform controller hub 1630 enables peripherals to connect to memory device 1620 and processor 1602 via a high-speed I/O bus. In at least one embodiment, I/O peripherals include, but are not limited to, an audio controller 1646, a network controller 1634, a firmware interface 1628, a wireless transceiver 1626, touch sensors 1625, a data storage device 1624 (e.g., hard disk drive, flash memory, etc.). In at least one embodiment, data storage device 1624 may connect via a storage interface (e.g., SATA) or via a peripheral bus, such as a Peripheral Component Interconnect bus (e.g., PCI, PCI Express). In at least one embodiment, touch sensors 1625 may include touch screen sensors, pressure sensors, or fingerprint sensors. In at least one embodiment, wireless transceiver 1626 may be a Wi-Fi transceiver, a Bluetooth transceiver, or a mobile network transceiver such as a 3G, 4G, or Long Term Evolution (LTE) transceiver. In at least one embodiment, firmware interface 1628 enables communication with system firmware, and may be, for example, a unified extensible firmware interface (UEFI). In at least one embodiment, network controller 1634 may enable a network connection to a wired network. In at least one embodiment, a high-performance network controller (not shown) couples with interface bus 1610. In at least one embodiment, audio controller 1646 is a multi-channel high definition audio controller. In at least one embodiment, system 1600 includes an optional legacy I/O controller 1640 for coupling legacy (e.g., Personal System 2 (PS/2)) devices to system. In at least one embodiment, platform controller hub 1630 may also connect to one or more Universal Serial Bus (USB) controllers 1642 connect input devices, such as keyboard and mouse 1643 combinations, a camera 1644, or other USB input devices.

In at least one embodiment, an instance of memory controller 1616 and platform controller hub 1630 may be integrated into a discreet external graphics processor, such as external graphics processor 1612. In at least one embodiment, platform controller hub 1630 and/or memory controller 1616 may be external to one or more processor(s) 1602. For example, in at least one embodiment, system 1600 may include an external memory controller 1616 and platform controller hub 1630, which may be configured as a memory controller hub and peripheral controller hub within a system chipset that is in communication with processor(s) 1602.

Inference and/or training logic 1215 are used to perform inferencing and/or training operations associated with one or more embodiments. Details regarding inference and/or training logic 1215 are provided below in conjunction with FIGS. 12A and/or 12B. In at least one embodiment portions or all of inference and/or training logic 1215 may be incorporated into graphics processor 1700. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 17:
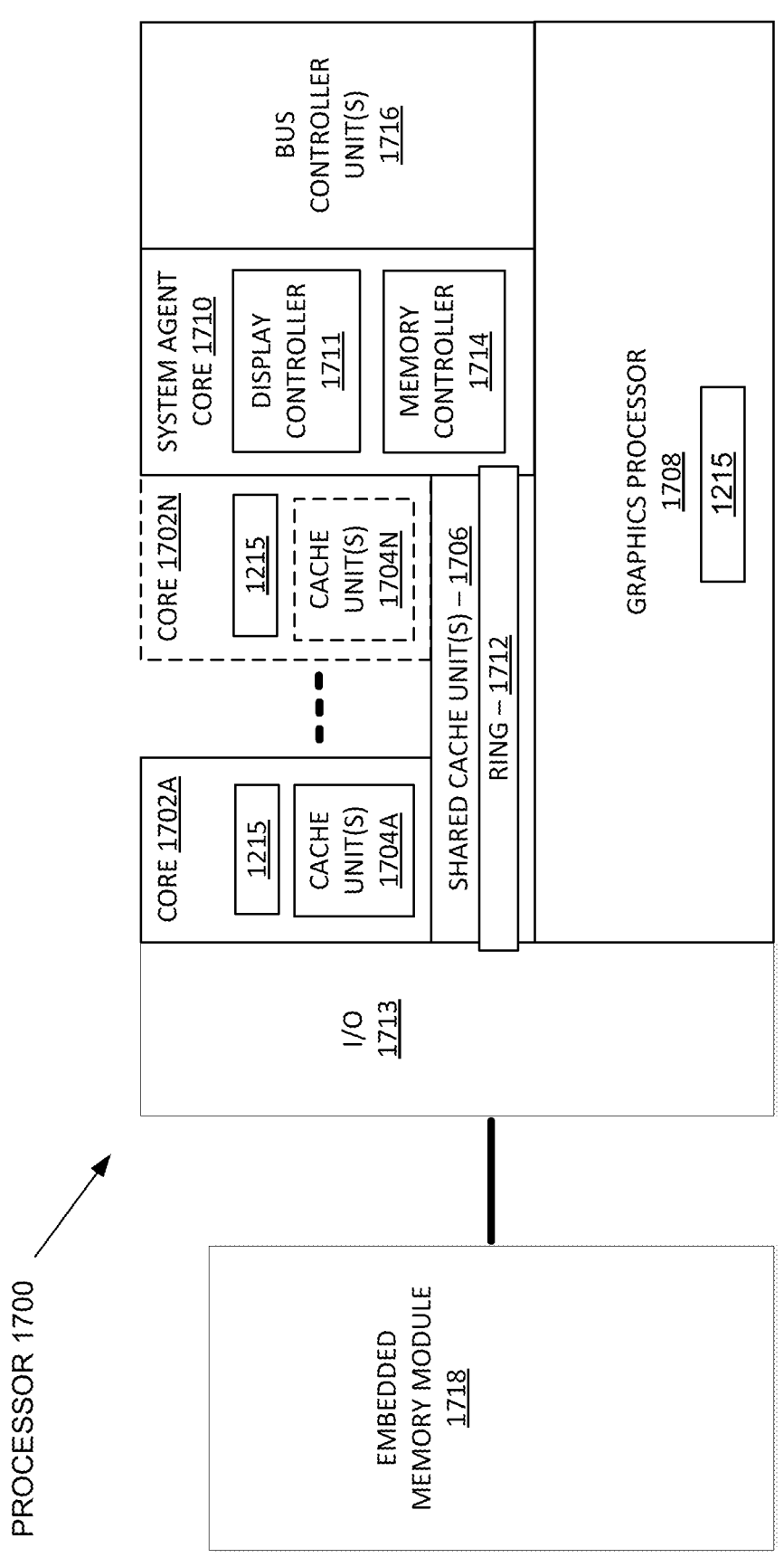
FIG. 17 illustrates at least portions of a graphics processor, according to one or more embodiments.

FIG. 17 is a block diagram of a processor 1700 having one or more processor cores 1702A-1702N, an integrated memory controller 1714, and an integrated graphics processor 1708, according to at least one embodiment. In at least one embodiment, processor 1700 may include additional cores up to and including additional core 1702N represented by dashed lined boxes. In at least one embodiment, each of processor cores 1702A-1702N includes one or more internal cache units 1704A-1704N. In at least one embodiment, each processor core also has access to one or more shared cached units 1706.

In at least one embodiment, internal cache units 1704A-1704N and shared cache units 1706 represent a cache memory hierarchy within processor 1700. In at least one embodiment, cache memory units 1704A-1704N may include at least one level of instruction and data cache within each processor core and one or more levels of shared mid-level cache, such as a Level 2 (L2), Level 3 (L3), Level 4 (LA), or other levels of cache, where a highest level of cache before external memory is classified as an LLC. In at least one embodiment, cache coherency logic maintains coherency between various cache units 1706 and 1704A-1704N.

In at least one embodiment, processor 1700 may also include a set of one or more bus controller units 1716 and a system agent core 1710. In at least one embodiment, one or more bus controller units 1716 manage a set of peripheral buses, such as one or more PCI or PCI express busses. In at least one embodiment, system agent core 1710 provides management functionality for various processor components. In at least one embodiment, system agent core 1710 includes one or more integrated memory controllers 1714 to manage access to various external memory devices (not shown).

In at least one embodiment, one or more of processor cores 1702A-1702N include support for simultaneous multi-threading. In at least one embodiment, system agent core 1710 includes components for coordinating and operating cores 1702A-1702N during multi-threaded processing. In at least one embodiment, system agent core 1710 may additionally include a power control unit (PCU), which includes logic and components to regulate one or more power states of processor cores 1702A-1702N and graphics processor 1708.

In at least one embodiment, processor 1700 additionally includes graphics processor 1708 to execute graphics processing operations. In at least one embodiment, graphics processor 1708 couples with shared cache units 1706, and system agent core 1710, including one or more integrated memory controllers 1714. In at least one embodiment, system agent core 1710 also includes a display controller 1711 to drive graphics processor output to one or more coupled displays. In at least one embodiment, display controller 1711 may also be a separate module coupled with graphics processor 1708 via at least one interconnect, or may be integrated within graphics processor 1708.

In at least one embodiment, a ring based interconnect unit 1712 is used to couple internal components of processor 1700. In at least one embodiment, an alternative interconnect unit may be used, such as a point-to-point interconnect, a switched interconnect, or other techniques. In at least one embodiment, graphics processor 1708 couples with ring interconnect 1712 via an I/O link 1713.

In at least one embodiment, I/O link 1713 represents at least one of multiple varieties of I/O interconnects, including an on package I/O interconnect which facilitates communication between various processor components and a high-performance embedded memory module 1718, such as an eDRAM module. In at least one embodiment, each of processor cores 1702A-1702N and graphics processor 1708 use embedded memory modules 1718 as a shared Last Level Cache.

In at least one embodiment, processor cores 1702A-1702N are homogenous cores executing a common instruction set architecture. In at least one embodiment, processor cores 1702A-1702N are heterogeneous in terms of instruction set architecture (ISA), where one or more of processor cores 1702A-1702N execute a common instruction set, while one or more other cores of processor cores 1702A-1702N executes a subset of a common instruction set or a different instruction set. In at least one embodiment, processor cores 1702A-1702N are heterogeneous in terms of microarchitecture, where one or more cores having a relatively higher power consumption couple with one or more power cores having a lower power consumption. In at least one embodiment, processor 1700 may be implemented on one or more chips or as an SoC integrated circuit.

Inference and/or training logic 1215 are used to perform inferencing and/or training operations associated with one or more embodiments. Details regarding inference and/or training logic 1215 are provided below in conjunction with FIGS. 12A and/or 12B. In at least one embodiment portions or all of inference and/or training logic 1215 may be incorporated into processor 1700. For example, in at least one embodiment, training and/or inferencing techniques described herein may use one or more of ALUs embodied in graphics processor 1708, graphics core(s) 1702A-1702N, or other components in FIG. 17. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of graphics processor 1700 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 18:
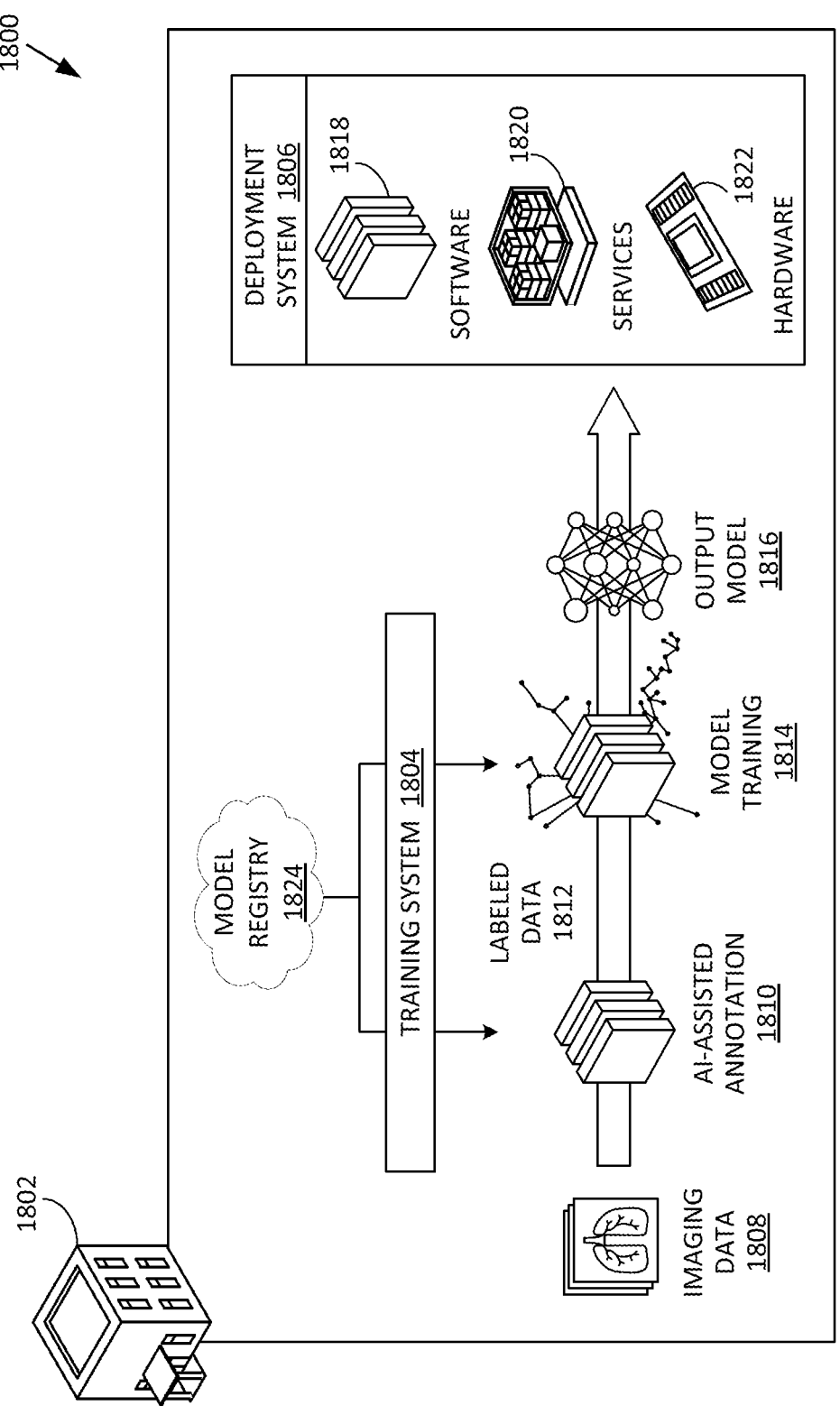
FIG. 18 is an example data flow diagram for an advanced computing pipeline, in accordance with at least one embodiment.

FIG. 18 is an example data flow diagram for a process 1800 of generating and deploying an image processing and inferencing pipeline, in accordance with at least one embodiment. In at least one embodiment, process 1800 may be deployed for use with imaging devices, processing devices, and/or other device types at one or more facilities 1802. Process 1800 may be executed within a training system 1804 and/or a deployment system 1806. In at least one embodiment, training system 1804 may be used to perform training, deployment, and implementation of machine learning models (e.g., neural networks, object detection algorithms, computer vision algorithms, etc.) for use in deployment system 1806. In at least one embodiment, deployment system 1806 may be configured to offload processing and compute resources among a distributed computing environment to reduce infrastructure requirements at facility 1802. In at least one embodiment, one or more applications in a pipeline may use or call upon services (e.g., inference, visualization, compute, AI, etc.) of deployment system 1806 during execution of applications.

In at least one embodiment, some of applications used in advanced processing and inferencing pipelines may use machine learning models or other AI to perform one or more processing steps. In at least one embodiment, machine learning models may be trained at facility 1802 using data 1808 (such as imaging data) generated at facility 1802 (and stored on one or more picture archiving and communication system (PACS) servers at facility 1802), may be trained using imaging or sequencing data 1808 from another facility (ies), or a combination thereof. In at least one embodiment, training system 1804 may be used to provide applications, services, and/or other resources for generating working, deployable machine learning models for deployment system 1806.

In at least one embodiment, model registry 1824 may be backed by object storage that may support versioning and object metadata. In at least one embodiment, object storage may be accessible through, for example, a cloud storage (e.g., cloud 1926 of FIG. 19) compatible application programming interface (API) from within a cloud platform. In at least one embodiment, machine learning models within model registry 1824 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1904 (FIG. 19) may include a scenario where facility 1802 is training their own machine learning model, or has an existing machine learning model that needs to be optimized or updated. In at least one embodiment, imaging data 1808 generated by imaging device(s), sequencing devices, and/or other device types may be received. In at least one embodiment, once imaging data 1808 is received, AI-assisted annotation 1810 may be used to aid in generating annotations corresponding to imaging data 1808 to be used as ground truth data for a machine learning model. In at least one embodiment, AI-assisted annotation 1810 may include one or more machine learning models (e.g., convolutional neural networks (CNNs)) that may be trained to generate annotations corresponding to certain types of imaging data 1808 (e.g., from certain devices). In at least one embodiment, AI-assisted annotations 1810 may then be used directly, or may be adjusted or fine-tuned using an annotation tool to generate ground truth data. In at least one embodiment, AI-assisted annotations 1810, labeled clinic data 1812, or a combination thereof may be used as ground truth data for training a machine learning model. In at least one embodiment, a trained machine learning model may be referred to as output model 1816, and may be used by deployment system 1806, as described herein.

In at least one embodiment, training pipeline 1904 (FIG. 19) may include a scenario where facility 1802 needs a machine learning model for use in performing one or more processing tasks for one or more applications in deployment system 1806, but facility 1802 may not currently have such a machine learning model (or may not have a model that is optimized, efficient, or effective for such purposes). In at least one embodiment, an existing machine learning model may be selected from a model registry 1824. In at least one embodiment, model registry 1824 may include machine learning models trained to perform a variety of different inference tasks on imaging data. In at least one embodiment, machine learning models in model registry 1824 may have been trained on imaging data from different facilities than facility 1802 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1824. In at least one embodiment, a machine learning model may then be retrained, or updated, at any number of other facilities, and a retrained or updated model may be made available in model registry 1824. In at least one embodiment, a machine learning model may then be selected from model registry 1824—and referred to as output model 1816—and may be used in deployment system 1806 to perform one or more processing tasks for one or more applications of a deployment system.

In at least one embodiment, training pipeline 1904 (FIG. 19), a scenario may include facility 1802 requiring a machine learning model for use in performing one or more processing tasks for one or more applications in deployment system 1806, but facility 1802 may not currently have such a machine learning model (or may not have a model that is optimized, efficient, or effective for such purposes). In at least one embodiment, a machine learning model selected from model registry 1824 may not be fine-tuned or optimized for imaging data 1808 generated at facility 1802 because of differences in populations, robustness of training data used to train a machine learning model, diversity in anomalies of training data, and/or other issues with training data. In at least one embodiment, AI-assisted annotation 1810 may be used to aid in generating annotations corresponding to imaging data 1808 to be used as ground truth data for retraining or updating a machine learning model. In at least one embodiment, labeled data 1812 may be used as ground truth data for training a machine learning model. In at least one embodiment, retraining or updating a machine learning model may be referred to as model training 1814. In at least one embodiment, model training 1814—e.g., AI-assisted annotations 1810, labeled clinic data 1812, or a combination thereof—may be used as ground truth data for retraining or updating a machine learning model. In at least one embodiment, a trained machine learning model may be referred to as output model 1816, and may be used by deployment system 1806, as described herein.

In at least one embodiment, deployment system 1806 may include software 1818, services 1820, hardware 1822, and/or other components, features, and functionality. In at least one embodiment, deployment system 1806 may include a software "stack," such that software 1818 may be built on top of services 1820 and may use services 1820 to perform some or all of processing tasks, and services 1820 and software 1818 may be built on top of hardware 1822 and use hardware 1822 to execute processing, storage, and/or other compute tasks of deployment system 1806. In at least one embodiment, software 1818 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1808, in addition to containers that receive and configure imaging data for use by each container and/or for use by facility 1802 after processing through a pipeline (e.g., to convert outputs back to a usable data type). In at least one embodiment, a combination of containers within software 1818 (e.g., that make up a pipeline) may be referred to as a virtual instrument (as described in more detail herein), and a virtual instrument may leverage services 1820 and hardware 1822 to execute some or all processing tasks of applications instantiated in containers.

In at least one embodiment, a data processing pipeline may receive input data (e.g., imaging data 1808) in a specific format in response to an inference request (e.g., a request from a user of deployment system 1806). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1816 of training system 1804.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1824 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1820 as a system (e.g., system 1900 of FIG. 19). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1900 (e.g., for accuracy), an application may be available in a container registry for selection and/or implementation by a user to perform one or more processing tasks with respect to data at a facility (e.g., a second facility) of a user.

Figure 19:
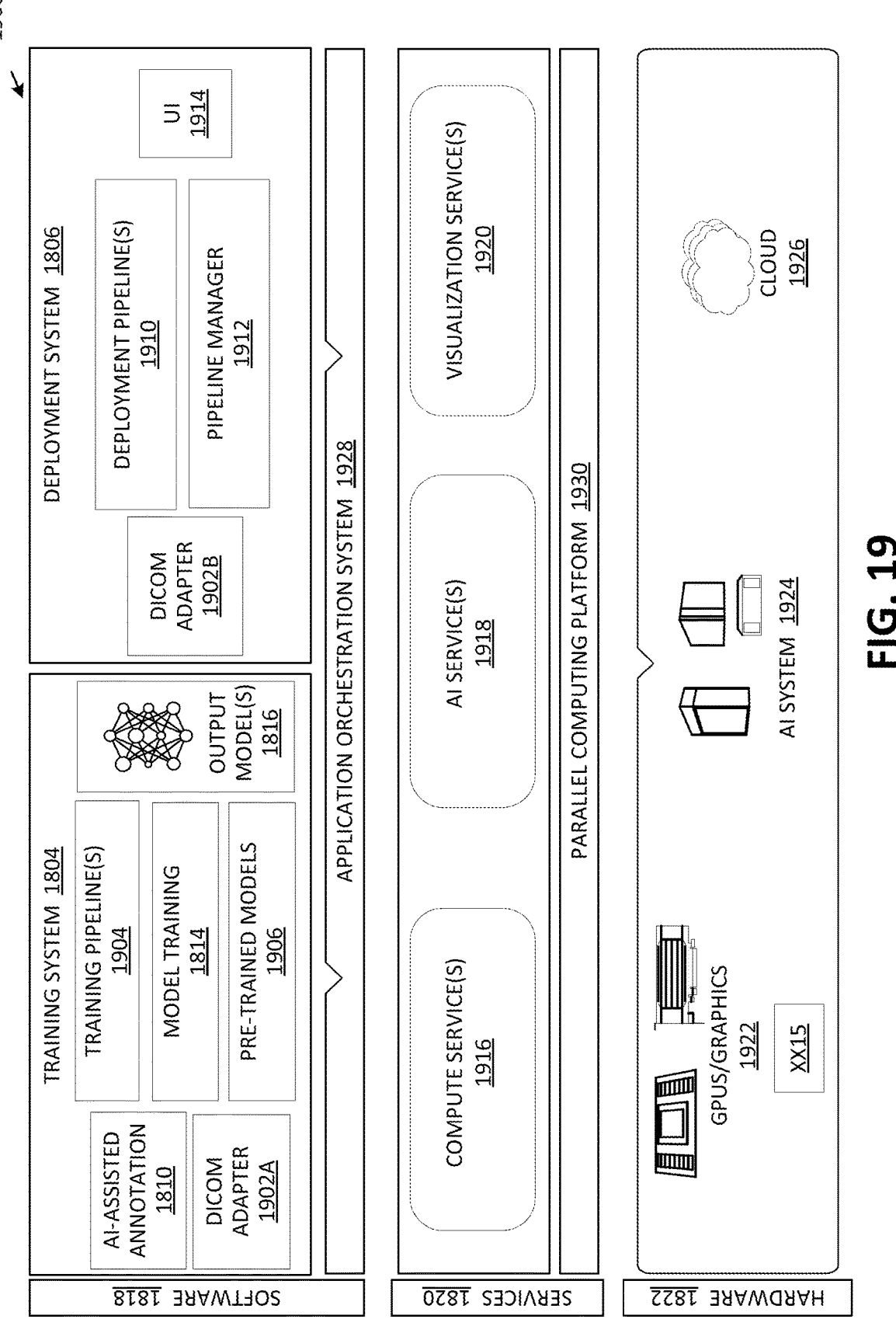
FIG. 19 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1900 of FIG. 19). In at least one embodiment, completed and validated applications or containers may be stored in a container registry and associated machine learning models may be stored in model registry 1824. In at least one embodiment, a requesting entity-who provides an inference or image processing request—may browse a container registry and/or model registry 1824 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1806 (e.g., a cloud) to perform processing of data processing pipeline. In at least one embodiment, processing by deployment system 1806 may include referencing selected elements (e.g., applications, containers, models, etc.) from a container registry and/or model registry 1824. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1820 may be leveraged. In at least one embodiment, services 1820 may include compute services, artificial intelligence (AI) services, visualization services, and/or other service types. In at least one embodiment, services 1820 may provide functionality that is common to one or more applications in software 1818, so functionality may be abstracted to a service that may be called upon or leveraged by applications. In at least one embodiment, functionality provided by services 1820 may run dynamically and more efficiently, while also scaling well by allowing applications to process data in parallel (e.g., using a parallel computing platform 1930 (FIG. 19)). In at least one embodiment, rather than each application that shares a same functionality offered by a service 1820 being required to have a respective instance of service 1820, service 1820 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.-to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1820 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1818 implementing advanced processing and inferencing pipeline that includes segmentation application and anomaly detection application may be streamlined because each application may call upon a same inference service to perform one or more inferencing tasks.

In at least one embodiment, hardware 1822 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1822 may be used to provide efficient, purpose-built support for software 1818 and services 1820 in deployment system 1806. In at least one embodiment, use of GPU processing may be implemented for processing locally (e.g., at facility 1802), within an AI/deep learning system, in a cloud system, and/or in other processing components of deployment system 1806 to improve efficiency, accuracy, and efficacy of image processing and generation. In at least one embodiment, software 1818 and/or services 1820 may be optimized for GPU processing with respect to deep learning, machine learning, and/or high-performance computing, as non-limiting examples. In at least one embodiment, at least some of computing environment of deployment system 1806 and/or training system 1804 may be executed in a datacenter one or more supercomputers or high performance computing systems, with GPU optimized software (e.g., hardware and software combination of NVIDIA's DGX System). In at least one embodiment, hardware 1822 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 19 is a system diagram for an example system 1900 for generating and deploying an imaging deployment pipeline, in accordance with at least one embodiment. In at least one embodiment, system 1900 may be used to implement process 1800 of FIG. 18 and/or other processes including advanced processing and inferencing pipelines. In at least one embodiment, system 1900 may include training system 1804 and deployment system 1806. In at least one embodiment, training system 1804 and deployment system 1806 may be implemented using software 1818, services 1820, and/or hardware 1822, as described herein.

In at least one embodiment, system 1900 (e.g., training system 1804 and/or deployment system 1806) may implemented in a cloud computing environment (e.g., using cloud 1926). In at least one embodiment, system 1900 may be implemented locally with respect to a healthcare services facility, or as a combination of both cloud and local computing resources. In at least one embodiment, access to APIs in cloud 1926 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1900, may be restricted to a set of public IPs that have been vetted or authorized for interaction.

In at least one embodiment, various components of system 1900 may communicate between and among one another using any of a variety of different network types, including but not limited to local area networks (LANs) and/or wide area networks (WANs) via wired and/or wireless communication protocols. In at least one embodiment, communication between facilities and components of system 1900 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1804 may execute training pipelines 1904, similar to those described herein with respect to FIG. 18. In at least one embodiment, where one or more machine learning models are to be used in deployment pipelines 1910 by deployment system 1806, training pipelines 1904 may be used to train or retrain one or more (e.g. pre-trained) models, and/or implement one or more of pre-trained models 1906 (e.g., without a need for retraining or updating). In at least one embodiment, as a result of training pipelines 1904, output model(s) 1816 may be generated. In at least one embodiment, training pipelines 1904 may include any number of processing steps, such as but not limited to imaging data (or other input data) conversion or adaption In at least one embodiment, for different machine learning models used by deployment system 1806, different training pipelines 1904 may be used. In at least one embodiment, training pipeline 1904 similar to a first example described with respect to FIG. 18 may be used for a first machine learning model, training pipeline 1904 similar to a second example described with respect to FIG. 18 may be used for a second machine learning model, and training pipeline 1904 similar to a third example described with respect to FIG. 18 may be used for a third machine learning model. In at least one embodiment, any combination of tasks within training system 1804 may be used depending on what is required for each respective machine learning model. In at least one embodiment, one or more of machine learning models may already be trained and ready for deployment so machine learning models may not undergo any processing by training system 1804, and may be implemented by deployment system 1806.

In at least one embodiment, output model(s) 1816 and/or pre-trained model(s) 1906 may include any types of machine learning models depending on implementation or embodiment. In at least one embodiment, and without limitation, machine learning models used by system 1900 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1904 may include AI-assisted annotation, as described in more detail herein with respect to at least FIG. 20B. In at least one embodiment, labeled data 1812 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1808 (or other data type used by machine learning models), there may be corresponding ground truth data generated by training system 1804. In at least one embodiment, AI-assisted annotation may be performed as part of deployment pipelines 1910; either in addition to, or in lieu of AI-assisted annotation included in training pipelines 1904. In at least one embodiment, system 1900 may include a multi-layer platform that may include a software layer (e.g., software 1818) of diagnostic applications (or other application types) that may perform one or more medical imaging and diagnostic functions. In at least one embodiment, system 1900 may be communicatively coupled to (e.g., via encrypted links) PACS server networks of one or more facilities. In at least one embodiment, system 1900 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1802). In at least one embodiment, applications may then call or execute one or more services 1820 for performing compute, AI, or visualization tasks associated with respective applications, and software 1818 and/or services 1820 may leverage hardware 1822 to perform processing tasks in an effective and efficient manner.

In at least one embodiment, deployment system 1806 may execute deployment pipelines 1910. In at least one embodiment, deployment pipelines 1910 may include any number of applications that may be sequentially, non-sequentially, or otherwise applied to imaging data (and/or other data types) generated by imaging devices, sequencing devices, genomics devices, etc.-including AI-assisted annotation, as described above. In at least one embodiment, as described herein, a deployment pipeline 1910 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1910 depending on information desired from data generated by a device. In at least one embodiment, where detections of anomalies are desired from an MRI machine, there may be a first deployment pipeline 1910, and where image enhancement is desired from output of an MRI machine, there may be a second deployment pipeline 1910.

In at least one embodiment, an image generation application may include a processing task that includes use of a machine learning model. In at least one embodiment, a user may desire to use their own machine learning model, or to select a machine learning model from model registry 1824. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1900—such as services 1820 and hardware 1822—deployment pipelines 1910 may be even more user friendly, provide for easier integration, and produce more accurate, efficient, and timely results.

In at least one embodiment, deployment system 1806 may include a user interface 1914 (e.g., a graphical user interface, a web interface, etc.) that may be used to select applications for inclusion in deployment pipeline(s) 1910, arrange applications, modify, or change applications or parameters or constructs thereof, use and interact with deployment pipeline(s) 1910 during set-up and/or deployment, and/or to otherwise interact with deployment system 1806. In at least one embodiment, although not illustrated with respect to training system 1804, user interface 1914 (or a different user interface) may be used for selecting models for use in deployment system 1806, for selecting models for training, or retraining, in training system 1804, and/or for otherwise interacting with training system 1804.

In at least one embodiment, pipeline manager 1912 may be used, in addition to an application orchestration system 1928, to manage interaction between applications or containers of deployment pipeline(s) 1910 and services 1820 and/or hardware 1822. In at least one embodiment, pipeline manager 1912 may be configured to facilitate interactions from application to application, from application to service 1820, and/or from application or service to hardware 1822. In at least one embodiment, although illustrated as included in software 1818, this is not intended to be limiting, and in some examples (e.g., as illustrated in FIG. 17) pipeline manager 1912 may be included in services 1820. In at least one embodiment, application orchestration system 1928 (e.g., Kubernetes, DOCKER, etc.) may include a container orchestration system that may group applications into containers as logical units for coordination, management, scaling, and deployment. In at least one embodiment, by associating applications from deployment pipeline(s) 1910 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1912 and application orchestration system 1928. In at least one embodiment, so long as an expected input and/or output of each container or application is known by a system (e.g., based on constructs of applications or containers), application orchestration system 1928 and/or pipeline manager 1912 may facilitate communication among and between, and sharing of resources among and between, each of applications or containers. In at least one embodiment, because one or more of applications or containers in deployment pipeline(s) 1910 may share same services and resources, application orchestration system 1928 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1928) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1820 leveraged by and shared by applications or containers in deployment system 1806 may include compute services 1916, AI services 1918, visualization services 1920, and/or other service types. In at least one embodiment, applications may call (e.g., execute) one or more of services 1820 to perform processing operations for an application. In at least one embodiment, compute services 1916 may be leveraged by applications to perform super-computing or other high-performance computing (HPC) tasks. In at least one embodiment, compute service(s) 1916 may be leveraged to perform parallel processing (e.g., using a parallel computing platform 1930) for processing data through one or more of applications and/or one or more tasks of a single application, substantially simultaneously. In at least one embodiment, parallel computing platform 1930 (e.g., NVIDIA's CUDA) may enable general purpose computing on GPUs (GPGPU) (e.g., GPUs 1922). In at least one embodiment, a software layer of parallel computing platform 1930 may provide access to virtual instruction sets and parallel computational elements of GPUs, for execution of compute kernels. In at least one embodiment, parallel computing platform 1930 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1930 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1918 may be leveraged to perform inferencing services for executing machine learning model(s) associated with applications (e.g., tasked with performing one or more processing tasks of an application). In at least one embodiment, AI services 1918 may leverage AI system 1924 to execute machine learning model(s) (e.g., neural networks, such as CNNs) for segmentation, reconstruction, object detection, feature detection, classification, and/or other inferencing tasks. In at least one embodiment, applications of deployment pipeline(s) 1910 may use one or more of output models 1816 from training system 1804 and/or other models of applications to perform inference on imaging data. In at least one embodiment, two or more examples of inferencing using application orchestration system 1928 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1928 may distribute resources (e.g., services 1820 and/or hardware 1822) based on priority paths for different inferencing tasks of AI services 1918.

In at least one embodiment, shared storage may be mounted to AI services 1918 within system 1900. In at least one embodiment, shared storage may operate as a cache (or other storage device type) and may be used to process inference requests from applications. In at least one embodiment, when an inference request is submitted, a request may be received by a set of API instances of deployment system 1806, and one or more instances may be selected (e.g., for best fit, for load balancing, etc.) to process a request. In at least one embodiment, to process a request, a request may be entered into a database, a machine learning model may be located from model registry 1824 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1912) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<11 min). In at least one embodiment, model execution times may be measured from requesting institution or entity and may include partner network traversal time, as well as execution on an inference service.

In at least one embodiment, transfer of requests between services 1820 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1926, and an inference service may perform inferencing on a GPU.

In at least one embodiment, visualization services 1920 may be leveraged to generate visualizations for viewing outputs of applications and/or deployment pipeline(s) 1910. In at least one embodiment, GPUs 1922 may be leveraged by visualization services 1920 to generate visualizations. In at least one embodiment, rendering effects, such as ray-tracing, may be implemented by visualization services 1920 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1920 may include an internal visualizer, cinematics, and/or other rendering or image processing capabilities or functionality (e.g., ray tracing, rasterization, internal optics, etc.).

In at least one embodiment, hardware 1822 may include GPUs 1922, AI system 1924, cloud 1926, and/or any other hardware used for executing training system 1804 and/or deployment system 1806. In at least one embodiment, GPUs 1922 (e.g., NVIDIA's TESLA and/or QUADRO GPUs) may include any number of GPUs that may be used for executing processing tasks of compute services 1916, AI services 1918, visualization services 1920, other services, and/or any of features or functionality of software 1818. For example, with respect to AI services 1918, GPUs 1922 may be used to perform pre-processing on imaging data (or other data types used by machine learning models), post-processing on outputs of machine learning models, and/or to perform inferencing (e.g., to execute machine learning models). In at least one embodiment, cloud 1926, AI system 1924, and/or other components of system 1900 may use GPUs 1922. In at least one embodiment, cloud 1926 may include a GPU-optimized platform for deep learning tasks. In at least one embodiment, AI system 1924 may use GPUs, and cloud 1926—or at least a portion tasked with deep learning or inferencing—may be executed using one or more AI systems 1924. As such, although hardware 1822 is illustrated as discrete components, this is not intended to be limiting, and any components of hardware 1822 may be combined with, or leveraged by, any other components of hardware 1822.

In at least one embodiment, AI system 1924 may include a purpose-built computing system (e.g., a super-computer or an HPC) configured for inferencing, deep learning, machine learning, and/or other artificial intelligence tasks. In at least one embodiment, AI system 1924 (e.g., NVIDIA's DGX) may include GPU-optimized software (e.g., a software stack) that may be executed using a plurality of GPUs 1922, in addition to DPUs, CPUs, RAM, storage, and/or other components, features, or functionality. In at least one embodiment, one or more AI systems 1924 may be implemented in cloud 1926 (e.g., in a data center) for performing some or all of AI-based processing tasks of system 1900.

In at least one embodiment, cloud 1926 may include a GPU-accelerated infrastructure (e.g., NVIDIA's NGC) that may provide a GPU-optimized platform for executing processing tasks of system 1900. In at least one embodiment, cloud 1926 may include an AI system(s) 1924 for performing one or more of AI-based tasks of system 1900 (e.g., as a hardware abstraction and scaling platform). In at least one embodiment, cloud 1926 may integrate with application orchestration system 1928 leveraging multiple GPUs to enable seamless scaling and load balancing between and among applications and services 1820. In at least one embodiment, cloud 1926 may tasked with executing at least some of services 1820 of system 1900, including compute services 1916, AI services 1918, and/or visualization services 1920, as described herein. In at least one embodiment, cloud 1926 may perform small and large batch inference (e.g., executing NVIDIA's TENSOR RT), provide an accelerated parallel computing API and platform 1930 (e.g., NVIDIA's CUDA), execute application orchestration system 1928 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1900.

Figure 20A:
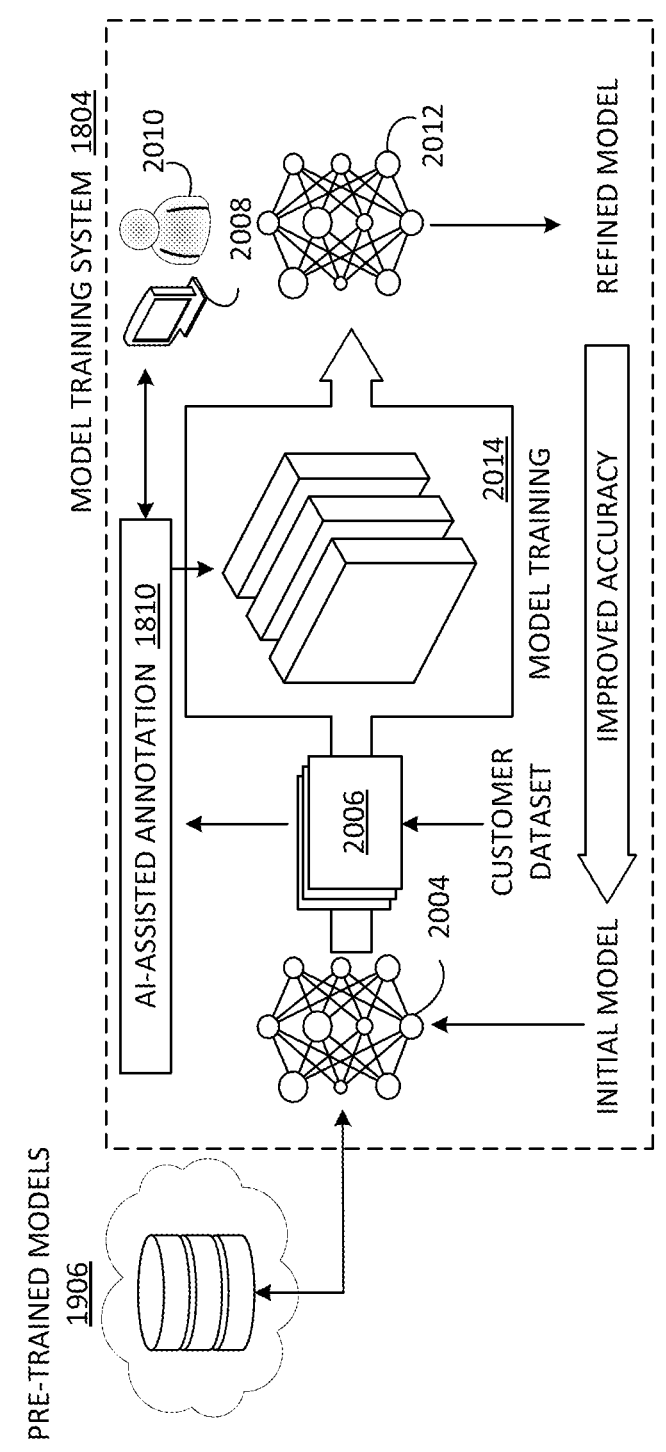

FIG. 20A illustrates a data flow diagram for a process 2000 to train, retrain, or update a machine learning model, in accordance with at least one embodiment. In at least one embodiment, process 2000 may be executed using, as a non-limiting example, system 1900 of FIG. 19. In at least one embodiment, process 2000 may leverage services 1820 and/or hardware 1822 of system 1900, as described herein. In at least one embodiment, refined models 2012 generated by process 2000 may be executed by deployment system 1806 for one or more containerized applications in deployment pipelines 1910.

In at least one embodiment, model training 1814 may include retraining or updating an initial model 2004 (e.g., a pre-trained model) using new training data (e.g., new input data, such as customer dataset 2006, and/or new ground truth data associated with input data). In at least one embodiment, to retrain, or update, initial model 2004, output or loss layer(s) of initial model 2004 may be reset, or deleted, and/or replaced with an updated or new output or loss layer(s). In at least one embodiment, initial model 2004 may have previously fine-tuned parameters (e.g., weights and/or biases) that remain from prior training, so training or retraining 1814 may not take as long or require as much processing as training a model from scratch. In at least one embodiment, during model training 1814, by having reset or replaced output or loss layer(s) of initial model 2004, parameters may be updated and re-tuned for a new data set based on loss calculations associated with accuracy of output or loss layer(s) at generating predictions on new, customer dataset 2006 (e.g., image data 1808 of FIG. 18).

In at least one embodiment, pre-trained models 1906 may be stored in a data store, or registry (e.g., model registry 1824 of FIG. 18). In at least one embodiment, pre-trained models 1906 may have been trained, at least in part, at one or more facilities other than a facility executing process 2000. In at least one embodiment, to protect privacy and rights of patients, subjects, or clients of different facilities, pre-trained models 1906 may have been trained, on-premise, using customer or patient data generated on-premise. In at least one embodiment, pre-trained models 1906 may be trained using cloud 1926 and/or other hardware 1822, but confidential, privacy protected patient data may not be transferred to, used by, or accessible to any components of cloud 1926 (or other off premise hardware). In at least one embodiment, where a pre-trained model 1906 is trained at using patient data from more than one facility, pre-trained model 1906 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1906 on-premise and/or off premise, such as in a datacenter or other cloud computing infrastructure.

In at least one embodiment, when selecting applications for use in deployment pipelines 1910, a user may also select machine learning models to be used for specific applications. In at least one embodiment, a user may not have a model for use, so a user may select a pre-trained model 1906 to use with an application. In at least one embodiment, pre-trained model 1906 may not be optimized for generating accurate results on customer dataset 2006 of a facility of a user (e.g., based on patient diversity, demographics, types of medical imaging devices used, etc.). In at least one embodiment, prior to deploying pre-trained model 1906 into deployment pipeline 1910 for use with an application(s), pre-trained model 1906 may be updated, retrained, and/or fine-tuned for use at a respective facility.

In at least one embodiment, a user may select pre-trained model 1906 that is to be updated, retrained, and/or fine-tuned, and pre-trained model 1906 may be referred to as initial model 2004 for training system 1804 within process 2000. In at least one embodiment, customer dataset 2006 (e.g., imaging data, genomics data, sequencing data, or other data types generated by devices at a facility) may be used to perform model training 1814 (which may include, without limitation, transfer learning) on initial model 2004 to generate refined model 2012. In at least one embodiment, ground truth data corresponding to customer dataset 2006 may be generated by training system 1804. In at least one embodiment, ground truth data may be generated, at least in part, by clinicians, scientists, doctors, practitioners, at a facility (e.g., as labeled clinic data 1812 of FIG. 18).

In at least one embodiment, AI-assisted annotation 1810 may be used in some examples to generate ground truth data. In at least one embodiment, AI-assisted annotation 1810 (e.g., implemented using an AI-assisted annotation SDK) may leverage machine learning models (e.g., neural networks) to generate suggested or predicted ground truth data for a customer dataset. In at least one embodiment, user 2010 may use annotation tools within a user interface (a graphical user interface (GUI)) on computing device 2008.

In at least one embodiment, user 2010 may interact with a GUI via computing device 2008 to edit or fine-tune (auto) annotations. In at least one embodiment, a polygon editing feature may be used to move vertices of a polygon to more accurate or fine-tuned locations.

In at least one embodiment, once customer dataset 2006 has associated ground truth data, ground truth data (e.g., from AI-assisted annotation, manual labeling, etc.) may be used by during model training 1814 to generate refined model 2012. In at least one embodiment, customer dataset 2006 may be applied to initial model 2004 any number of times, and ground truth data may be used to update parameters of initial model 2004 until an acceptable level of accuracy is attained for refined model 2012. In at least one embodiment, once refined model 2012 is generated, refined model 2012 may be deployed within one or more deployment pipelines 1910 at a facility for performing one or more processing tasks with respect to medical imaging data.

In at least one embodiment, refined model 2012 may be uploaded to pre-trained models 1906 in model registry 1824 to be selected by another facility. In at least one embodiment, his process may be completed at any number of facilities such that refined model 2012 may be further refined on new datasets any number of times to generate a more universal model.

FIG. 20B is an example illustration of a client-server architecture 2032 to enhance annotation tools with pre-trained annotation models, in accordance with at least one embodiment. In at least one embodiment, AI-assisted annotation tools 2036 may be instantiated based on a client-server architecture 2032. In at least one embodiment, annotation tools 2036 in imaging applications may aid radiologists, for example, identify organs and abnormalities. In at least one embodiment, imaging applications may include software tools that help user 2010 to identify, as a non-limiting example, a few extreme points on a particular organ of interest in raw images 2034 (e.g., in a 3D MRI or CT scan) and receive auto-annotated results for all 2D slices of a particular organ. In at least one embodiment, results may be stored in a data store as training data 2038 and used as (for example and without limitation) ground truth data for training. In at least one embodiment, when computing device 2008 sends extreme points for AI-assisted annotation 1810, a deep learning model, for example, may receive this data as input and return inference results of a segmented organ or abnormality. In at least one embodiment, pre-instantiated annotation tools, such as AI-Assisted Annotation Tool 2036B in FIG. 20B, may be enhanced by making API calls (e.g., API Call 2044) to a server, such as an Annotation Assistant Server 2040 that may include a set of pre-trained models 2042 stored in an annotation model registry, for example. In at least one embodiment, an annotation model registry may store pre-trained models 2042 (e.g., machine learning models, such as deep learning models) that are pre-trained to perform AI-assisted annotation on a particular organ or abnormality. These models may be further updated by using training pipelines 1904. In at least one embodiment, pre-installed annotation tools may be improved over time as new labeled clinic data 1812 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
selecting a plurality of multi-modal digital avatar (DA) resources, wherein individual multi-modal DA resources of the plurality of multi-modal DA resources program multi-modal DA episodes of an interaction between a user and a computing device;
identifying, for a first multi-modal DA resource of the plurality of multi-modal DA resources, at least a first modal input event of a plurality of modal input events and a second modal input event of the plurality of modal input events;
generating a graph structure that defines an execution flow for the plurality of multi-modal DA resources and comprises:
a plurality of nodes comprising a first node associated with the first multi-modal DA resource, a second node associated with a second multi-modal DA resource of the plurality of multi-modal DA resources, and a third node associated with a third multi-modal DA resource of the plurality of multi-modal DA resources, and
a plurality of directional edges comprising:
a first directional edge associated with a transition of the execution flow from the first node to the second node conditioned on an event handler of the first node responding to an occurrence of the first modal input event, and
a second directional edge associated with a transition of the execution flow from the first node to the third node conditioned on an event handler of the second node responding to an occurrence of the second modal input event;
executing, by a processing device, a compiler to transform the generated graph structure into an executable file comprising instructions that execute the plurality of multi-modal DA resources on a computing device; and
executing, by the computing device, the executable file to cause the computing device to respond to one or more interactions with a user by dynamically transitioning between one or more DA resources of the plurality of multi-modal DA resources responsive to detection of one or more modal input events of the plurality of modal input events.

2. The method of claim 1, wherein the second node is a child node of the first node, wherein the second node comprises one or more attributes, and wherein the first node is configured to modify at least one attribute of the one or more attributes of the second node conditioned on an occurrence of a third modal input event of the plurality of modal input events.

3. The method of claim 2, wherein the third node is a child of the second node.

4. The method of claim 1, wherein the transition of the execution flow from the first node to the second node is further conditioned on an active state of the first node.

5. The method of claim 1, wherein the plurality of nodes further comprises a fourth node associated with a fourth multi-modal DA resource of the plurality of multi-modal DA resources;
wherein the second node is a starting node of a first branch, the third node is a starting node of a second branch, and the fourth node is a starting node of a third branch; and
wherein in a first state of the execution flow, the first branch is active, the second branch is sleeping, and the third branch is inactive.

6. The method of claim 1, further comprising:
identifying one or more continuous properties; and
configuring the first multi-modal DA resource to modify the one or more continuous properties based on the occurrence of the first modal input event.

7. The method of claim 1, wherein the plurality of modal input events comprises at least one of:

an audio-mode event;

a motion-mode event; or a tactile-mode event.

8. A method comprising:

detecting, using a graphics user interface (GUI), a first event associated with a multi-modal digital avatar (DA) interaction between a user and a computing device;

accessing, by a processing device, a graph structure stored in a memory device communicatively coupled to a processing device, the graph structure comprising executable, by the processing device, multi-modal DA execution flow instructions defining the multi-modal DA interaction, the graph structure comprising:

a plurality of nodes representing a plurality of multi-modal DA interaction resources, wherein individual multi-modal DA interaction resources program respective multi-modal DA interaction episodes, and a plurality of directional edges, wherein individual directional edges are associated with conditional transitions of the multi-modal DA execution flow instructions between two nodes of the plurality of nodes;

determining, by the processing device, that a first directional edge of the plurality of directional edges is conditioned on an event handler of a first node of the plurality of nodes responding to an occurrence of the first event, the first directional edge connecting the first node of the plurality of nodes with a second node of the plurality of nodes, and the event handler of the first node monitors at least one of audio-mode events, motion-mode events, or tactile-mode events;

causing the multi-modal DA execution flow instructions to transition from the first node to the second node and execute an action, associated with the second node, as part of the multi-modal DA interaction between the user and the computing device.

9. The method of claim 8, further comprising:

detecting a second event associated with the multi-modal DA interaction between the user and the computing device;

determining that the first node comprises a second directional edge of the plurality of directional edges conditioned on the event handler of the first node responding to an occurrence of the second event, wherein the second directional edge connects the first node of the plurality of nodes with a third node of the plurality of nodes; and causing the multi-modal DA execution flow instructions to transition from the second node to the third node.

10. The method of claim 8, wherein the graph further comprises a parent node and a child node, wherein the child node comprises one or more attributes, and wherein the parent node is configured to modify at least one attribute of the one or more attributes of the child node conditioned on an occurrence of a predetermined event.

11. The method of claim 8, wherein causing the multi-modal DA execution flow instructions to transition from the first node to the second node is further conditioned on the first node being in an active state.

12. The method of claim 9, wherein the plurality of nodes further comprises a fourth node;

wherein the second node is a starting node of a first branch, the third node is a starting node of a second branch, and the fourth node is a starting node of a third branch; and wherein in a first state of the multi-modal DA execution flow instructions, the first branch is active, the second branch is sleeping, and the third branch is inactive.

13. The method of claim 8, further comprising:

identifying one or more continuous properties; and modifying, by a first multi-modal DA interaction resource associated with the first node, the one or more continuous properties based on the event handler of the first node responding to the occurrence of the first event.

14. A method, comprising:

receiving a configuration file for a multi-modal digital avatar (DA) resource; and running a compiler to generate, using the configuration file, an executable file comprising instructions that, when implemented on a computing device, cause the computing device to execute the multi-modal DA resource, wherein generating the executable file comprises:

configuring, using the compiler and according to the configuration file, a plurality of actions associated with the multi-modal DA resource;

configuring, using the compiler and according to the configuration file, one or more exit ports, each of the one or more exit ports associated with a corresponding transition of an execution flow from the multi-modal DA resource to another DA resource, conditional on one or more actions associated with a respective exit port;

configuring, using the compiler and according to the configuration file, one or more event handlers associated with the multi-modal DA resource to receive one or more modal input events, individual modal input events being associated with at least one of:

an audio-mode event associated with a DA-user interaction, a motion-mode event associated with the DA-user interaction, or a tactile-mode event associated with the DA-user interaction;

configuring, using the compiler and according to the configuration file, the one or more event handlers to select, responsive to a received modal input event of the one or more modal input events, from at least one of:

the plurality of actions, or the one or more exit ports.

15. The method of claim 14, wherein the plurality of actions comprises at least one of:

an audio-mode output action associated with the DA-user interaction, an animation-mode output action associated with the DA-user interaction, a graphic-mode output action associated with the DA-user interaction, a text-mode output action associated with the DA-user interaction, or an action comprising transferring control to a multi-modal DA resource different from the multi-modal DA resource.

16. The method of claim 14, further comprising:

configuring, by the compiler and according to the configuration file, one or more entry ports associated with the multi-modal DA resource; and associating an exit port of an additional multi-modal DA resource with a first entry port of the one or more entry ports of the multi-modal DA resource.

17. The method of claim 16, wherein the plurality of actions further comprises:

a state modification action, wherein the state modification action modifies a state of the multi-modal DA resource or the additional multi-modal DA resource.

18. The method of claim 17, wherein the one or more event handlers are to select from at least one of the plurality of actions or the one or more exit ports further responsive to the state of the multi-modal DA resource satisfying an activation condition.

19. The method of claim 14, wherein the method is performed by at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of augmented reality content, virtual reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

\* \* \* \* \*